(12) United States Patent
Kim et al.

(10) Patent No.: US 12,447,184 B1
(45) Date of Patent: Oct. 21, 2025

(54) LACTIC ACID BACTERIA AND USE THEREOF

(71) Applicants: UNIVERSITY-INDUSTRY COOPERATION GROUP OF KYUNG HEE UNIVERSITY, Gyeonggi-do (KR); NAVIPHARM CO. LTD, Gyeonggi-do (KR)

(72) Inventors: Dong-Hyun Kim, Seoul (KR); Myung Joo Han, Seoul (KR)

(73) Assignees: University-Industry Cooperation Group of Kyung Hee University, Gyeonggi-do (KR); NAVIPHARM CO., LTD., Gyeonggi-do (KR)

( * ) Notice: Subject to any disclaimer, the term of this patent is extended or adjusted under 35 U.S.C. 154(b) by 1599 days.

(21) Appl. No.: 16/614,242

(22) PCT Filed: Sep. 28, 2018

(86) PCT No.: PCT/KR2018/011607
§ 371 (c)(1),
(2) Date: Nov. 15, 2019

(87) PCT Pub. No.: WO2019/066599
PCT Pub. Date: Apr. 4, 2019

(30) Foreign Application Priority Data

Sep. 29, 2017 (KR) .................. 10-2017-0127422

(51) Int. Cl.
| | | |
|---|---|---|
| A61K 35/747 | (2015.01) | |
| A23L 33/135 | (2016.01) | |
| A61K 35/745 | (2015.01) | |
| C12N 1/20 | (2006.01) | |

(52) U.S. Cl.
CPC .......... *A61K 35/747* (2013.01); *A23L 33/135* (2016.08); *A61K 35/745* (2013.01); *C12N 1/205* (2021.05)

(58) Field of Classification Search
CPC ... A61K 35/747; A61K 35/745; A23L 33/135; C12N 1/205
USPC ...................................................... 424/93.3
See application file for complete search history.

(56) References Cited

U.S. PATENT DOCUMENTS

| | | |
|---|---|---|
| 2014/0363410 A1 | 12/2014 | Bergonzelli Degonda et al. |
| 2017/0191998 A1 | 7/2017 | Scheperjans et al. |

FOREIGN PATENT DOCUMENTS

| | | | |
|---|---|---|---|
| CA | 2998841 A1 | | 3/2017 |
| CN | 103209698 A | | 7/2013 |
| JP | 2008195635 A | * | 8/2008 |
| KR | 1020120015335 | | 2/2012 |
| KR | 1020140131505 A | | 11/2014 |
| KR | 20170061457 A | | 6/2017 |
| KR | 1020170090359 A | | 8/2017 |
| RU | 2616899 | | 4/2017 |
| WO | WO2013098033 | | 7/2013 |
| WO | 2016168359 A1 | | 10/2016 |
| WO | WO2016167365 | | 10/2016 |
| WO | WO2017160711 | | 9/2017 |

OTHER PUBLICATIONS

Kalia et al., "Parkinson's disease", Apr. 20, 2015, Lancet 2015, vol. 386, pp. 896-912; (Year: 2015).*
McColgan et al., "Huntington's disease: a clinical review", Aug. 17, 2017, European Journal of Neurology 2018, 25, pp. 24-34 (Year: 2017).*
Briggs et al., "Drug treatments in Alzheimer's disease", Jun. 1, 2016, Clinical Medicine 2016, vol. 16, No. 3, pp. 247-253 (Year: 2016).*
Kiernan et al., "Amyotrophic lateral sclerosis ", Feb. 7, 2011, Lancet 2011, vol. 377, pp. 942-945 (Year: 2011).*
Nakamura et al., 2014, "Mesenchymal Stem Cells as a Potential Therapeutic Tool for Spinocerebellar Ataxia", Oct. 4, 2014, Cerebellum, 2015, vol. 14, pp. 165-170 (Year: 2014).*
Buerk, "Friedreich Ataxia: current status and future prospects", Apr. 7, 2017, Cerebellum & Ataxias, 2017, vol. 4, Article 4, pp. 1-9 (Year: 2017).*
Paulson, "Machado-Joseph Disease/Spinocerebellar Ataxia Type 3", Feb. 11, 2013, Handb Clin Neurol., 2012, vol. 103, pp. 437-449 (Year: 2013).*
Thenganatt et al., "Treatment of Dystonia", Oct. 19, 2013, Neurotherapeutics, 2014, vol. 11, pp. 139-152 (Year: 2013).*
Van den Heuvel et al., "The Symptomatic Treatment of Acquired Dystonia: A Systematic Review"; Aug. 3, 2016, Movement Disorders Clinical Practice, 2016, vol. 3, Issue 6, pp. 521-626 (Year: 2016).*
Golbe, "Progressive Supranuclear Palsy", Jun. 25, 2014, Semin Neurol, 2014, vol. 34, pp. 151-159 (Year: 2014).*
Grand et al., "Clinical features and multidisciplinary approaches to dementia care", May 15, 2011, Journal of Multidisciplinary Healthcare 2011, vol. 4, pp. 125-147 (Year: 2011).*
Hallett, "Tourette Syndrome: Update", Jan. 17, 2015, Brain & Development 2015, vol. 37, pp. 651-655 (Year: 2015).*

(Continued)

*Primary Examiner* — Sharmila G Landau
*Assistant Examiner* — Sandra Zingarelli
(74) *Attorney, Agent, or Firm* — Wood, Phillips, Katz, Clark & Mortimer

(57) ABSTRACT

The present invention relates to a novel lactic acid bacterium, and more particularly, to a composition comprising *Lactobacillus reuteri* NK33 (KCCM12090P) or *Bifidobacterium adolescentis* NK98 (KCCM12297P), which is the novel lactic acid bacterium, useful in preventing and treating a neurological mental disease or an inflammatory disease. Also, the present invention relates to a composition for diagnosing a neurological mental disease, comprising a preparation for measuring a level of an intestinal microorganism, a kit comprising the same, and a method for diagnosing the neurological mental disease, comprising a step of measuring the level of the intestinal microorganism.

8 Claims, 15 Drawing Sheets

Specification includes a Sequence Listing.

(56) References Cited

OTHER PUBLICATIONS

Lu et al. "BDNF-based synaptic repair as a disease-modifying strategy for neurodegenerative diseases", May 15, 2013, Nature Reviews Neuroscience 2013, vol. 14, pp. 401-416 (Year: 2013).*
Thibaut, "Anxiety disorders: a review of current literature", Jun. 2017, Dialogues in Clinical Neuroscience, vol. 19(2), pp. 87-88 (Year: 2017).*
Lee et al., "Depression research: where are we now?", Mar. 10, 2010, Molecular Brain 2010, vol. 3, article 8, pp. 1-10 (Year: 2010).*
University of Rochester Medical Center, "Overview of Mood disorders", May 20, 2013, Online medical Encyclopedia (Year: 2013).*
Kerner, "Genetics of bipolar disorder", Feb. 12, 2014, The Application of Clinical Genetics 2014 (Year: 2014).*
Geddes et al., "Treatment of bipolar disorder", Nov. 5, 2013, Lancet 2013, vol. 381, pp. 1672-1682 (Year: 2013).*
Riemann et al., "European guideline for the diagnosis and treatment of insomnia", Sep. 5, 2017, J Sleep Res. 2017, vol. 26, p. 675-700 (Year: 2017).*
Roudsari et al., "Current Treatments for Delusional Disorder", Apr. 11, 2015, Curr Treat Options Psych 2015, vol. 2, pp. 151-167 (Year: 2015).*
Diener et al., "New therapeutic approaches for the prevention and treatment of migraine", Oct. 2015, Lancet Neurol 2015; 14: 1010-22 (Year: 2015).*
Tajti et al., "Migraine is a neuronal disease", Dec. 15, 2010, J Neural Transm 2011, vol. 118, pp. 511-524 (Year: 2011).*
Lucassen et al, "Neuropathology of stress", Dec. 8, 2013, Acta Neuropathol 2014, vol. 127, pp. 109-135 (Year: 2014).*
Matthews et al., "Memory Dysfunction"; Jun. 2015, Continuum (Minneap Minn) 2015, vol. 21(3), pp. 613-626 (Year: 2015).*
Pepeu et al., "Cholineesterase inhibitors and memory", Nov. 24, 2009, Chemico-Biological Interactions 2010, vol. 187, pp. 403-408 (Year: 2009).*
Banaschewski et al., "Attention-Deficit/Hyperactivity Disorder", Mar. 3, 2017, Dtsch Arztebl Int 2017, vol. 114(9), pp. 149-159 (Year: 2017).*
Okin et al., "Evolution of Inflammatory Diseases", Sep. 11, 2012, Current Biology, vol. 22, Issue 17, pp. R733-R740 (Year: 2012).*
Dinarello, "Anti-inflammatory Agents: Present and Future", Mar. 19, 2010, Cell, vol. 140, pp. 935-950 (Year: 2010).*
Riemann et al., "European guideline for the diagnosis and treatment of insomnia", Sep. 5, 2017, J Sleep Res. 2017, vol. 26, pp. 675-700 (Year: 2017).*
Bokor et al., Journal of Pharmacy Practice 2014, Feb. 27, 2014, vol. 27(2), pp. 116-130 (Year: 2014).*
Matthews, "Memory Dysfunction"; Jun. 2015, Continuum (Minneap Minn) 2015, vol. 21(3), pp. 613-626 (Year: 2015).*
Pepeu et al., "Cholinesterase inhibitors and memory", Nov. 24, 2009, Chemico-Biological Interactions 2010, vol. 187, pp. 403-408 (Year: 2009).*
Simpson, "DSM-5 and Neurocognitive Disorders", Jun. 2014, J Am Acad Psychiatry Law, vol. 42, Issue 2, pp. 159-164 (Year: 2014).*
KR Office Action for App No. KR 10-2018-0116643, dated Sep. 26, 2019 (machine translation) (4 pages).
KR Office Action for App No. KR 10-2017-0127422, dated Aug. 9, 2018 (machine translation) (3 pages).
Written Opinion for corresponding Singapore Application No. 10201913043T mailed Oct. 2, 2023.
Silvi S., et al., EU project Crownalife: functional foods, gut microflora and healthy ageing: Isolation and identification of Lactobacillus and Bifidobacterium strains from faecal samples of elderly subjects for a possible probiotic use in functional foods. Journal of Food Engineering, Jun. 12, 2002, vol. 56, No. 2-3, pp. 195-200.
International Search Report for PCT/KR2018/011607, mailed Apr. 3, 2019. 5 pages.
GenBank: MF754133.1: Lactobacillus Reuteri Strain N1 16S Ribosomal RNA Gene, Partial Sequence, Aug. 30, 2017.
JP Office Action in Japanese Appln. No. 2020/518088, dated Mar. 16, 2021, 14 pages with English Translation.
KR Office Action in Korean Appln. No. 1020180116643, dated Apr. 5, 2021, 4 pages with Machine Translation.
RU Office Action in Russian Appln. No. 2020114781/10(024588), dated Feb. 20, 2021, 17 pages with English Translation.
AU Examination Report No. 1 in Australian Appln. No. 2018341753, dated Jul. 16, 2021, 4 pages.
EP Extended Search Report in European Appln. No. 18860530.7, dated Jun. 2, 2021, 9 pages.
Liu et al., "Modulation of Gut Microbiota-Brain Axis by Probiotics, Prebiotics, and Diet", Journal of Agricultural and Food Chemistry, Sep. 16, 2015, 63(36):7885-7895.
Office Action for Brazilian Application No. BR112020005747-9 mailed Jul. 29, 2024.
Marin et al., "Microbiota alteration is associated with the development of stress-induced despair behavior", Scientific Reports, vol. 7, No. 1, published on Mar. 7, 2017.

* cited by examiner

LACTIC ACID BACTERIA AND USE THEREOF

SEQUENCE LISTING

This application contains a Sequence Listing that has been submitted electronically as an ASCII text file named 52068-0004US1SEQ.TXT. The ASCII text file, created on Sep. 30, 2021, is 12.0 kilobytes in size. The material in the ASCII text file is hereby incorporated by reference in its entirety.

TECHNICAL FIELD

The present invention relates to *Lactobacillus reuteri* and *Bifidobacterium adolescentis*, which are novel lactic acid bacteria, and more particularly, to a composition comprising the novel lactic acid bacteria useful in preventing and treating a neurological mental disease or an inflammatory disease.

Also, the present invention relates to a composition for diagnosing the neurological mental disease, comprising a preparation for measuring a level of an intestinal microorganism.

BACKGROUND

In modern society, neurological mental diseases including anxiety, depression, schizophrenia, etc. are on the increase due to a rapid rise in stress, etc. In particular, the trend is that more and more patients are suffering from mental disorders such as depression, anxiety and the like due to various causes such as social and structural ones, etc. in our modern times overflowing with individualism.

In severe cases, patients with mental disorders may end up committing suicide accidents. In particular, it is reported that more than half of depressed patients consider suicide. Indeed, it is known that 10 to 15% of those patients actually commit suicide.

Mental disorders have no clear and objective criteria for judgment yet, such that symptoms thereof may vary depending on respective patients. If there is any suspicion about mental disorders, treatment is required according to accurate diagnosis and examination. However, the reality is that such proper treatment is not done due to negative social attitudes toward hospital treatments for mental disorders. Also, drugs such as antidepressants, etc. used to treat mental disorders have not shown a satisfactory therapeutic effect thereon and may cause serious side effects such as cardiovascular diseases, suicide and the like, such that those drugs are limited in use.

On the other hand, as a result of study involving a use of natural products, a composition for treating mental disorders using a *Fomes fomentarius* extract and a *Lithospermum erythrorhizon* extract is disclosed in Korean patent publication No. 10-2017-0061457, but there is still a need for continuous research on effective lactic acid bacteria capable of treating mental disorders.

Against such backdrops, the present inventors identified that mental disorders may be diagnosed from a change in intestinal microbial communities, while studying a preventive and therapeutic agent for mental disorders, and further identified that novel lactic acid bacteria isolated from human and mouse feces show an effect of inhibiting a neurodegenerative disease-inducing factor, reducing anxious and depressive behaviors and the like, such that the novel lactic acid bacteria may be helpfully used in preventing or treating neurological mental diseases, particularly neurodegenerative diseases and mental disorders, thereby completed the present invention.

PRIOR ART REFERENCES

Patent Document (Patent Document 1) Korean patent publication No. 10-2017-0061457

DETAILED DESCRIPTION OF THE INVENTION

Technical Problem

An objective of the present invention is to provide a novel lactic acid bacterium.

Other objective of the present invention is to provide a composition for preventing or treating a neurological mental disease, comprising the novel lactic acid bacterium.

Another objective of the present invention is to provide a composition for preventing or treating an inflammatory disease, comprising the novel lactic acid bacterium.

Another objective of the present invention is to provide a composition for diagnosing the neurological mental disease, comprising a preparation for measuring a level of an intestinal microorganism.

Another objective of the present invention is to provide a method for diagnosing the neurological mental disease, comprising: a step of measuring a level of an intestinal microorganism from feces isolated from an individual suspicious about the neurological mental disease; and a step of comparing the level of the said intestinal microorganism with that of the intestinal microorganism in feces of a control group, rather than that of the neurological mental disease.

Technical Solution

In one aspect for achieving the said objectives, the present invention provides a novel lactic acid bacterium.

Particularly, in the present invention, the said novel lactic acid bacterium may be *Lactobacillus reuteri* NK33 (depository institution: the Korean Culture Center of Microorganisms (KCCM), date of deposit: Aug. 4, 2017, accession number: KCCM12090P) or *Bifidobacterium adolescentis* NK98 (depository institution: the KCCM, date of deposit: Aug. 3, 2018, accession number: KCCM12297P).

*Lactobacillus reuteri* NK33 or *Bifidobacterium adolescentis* NK98 according to the present invention is characterized by being a novel lactic acid bacterium isolated and identified from human or mouse feces.

A 16S rDNA sequence for identification and classification of *Lactobacillus reuteri* NK33 according to the present invention is the same as SEQ ID NO: 1 attached to the present specification. Thus, *Lactobacillus reuteri* NK33 according to the present invention may include the 16S rDNA of SEQ ID NO: 1. As a result of analyzing the 16S rDNA sequence of the said SEQ ID NO: 1, such sequence was 99% homologous to that of known *Lactobacillus reuteri* strains, thus showing the highest molecular phylogenetic relationship with *Lactobacillus reuteri*. Thus, the said lactic acid bacterium was identified as *Lactobacillus reuteri*, named as *Lactobacillus reuteri* NK33, and deposited to the KCCM on Aug. 4, 2017 (accession number: KCCM12090P).

*Lactobacillus reuteri* NK33 according to the present invention is a gram-positive bacterium and a cell type thereof is *bacillus*. More particularly, the physiological characteristics of *Lactobacillus reuteri* NK33 may be analyzed according to a conventional method in the art, wherein the results thereof are as shown in a following table 3. Particularly, *Lactobacillus reuteri* NK33 may use as a carbon source L-arabinose, D-ribose, D-xylose, D-galactose, D-glucose, D-fructose, D-mannose, mannitol, sorbitol, N-acetyl-glucosamine, amygdaline, arbutin, esculin, salicin, cellobiose, maltose, lactose, melibiose, sucrose, trehalose, melezitose, raffinose, gentiobiose, D-turanose and gluconate.

A 16S rDNA sequence for identification and classification of *Bifidobacterium adolescentis* NK98 according to the present invention is the same as SEQ ID NO: 38 attached to the present specification. Thus, *Bifidobacterium adolescentis* NK98 according to the present invention may include the 16S rDNA of SEQ ID NO: 38. As a result of analyzing the 16S rDNA sequence of the said SEQ ID NO: 38, such sequence was 98% homologous to that of a known *Bifidobacterium adolescentis* strain, thus showing the highest molecular phylogenetic relationship with *Bifidobacterium adolescentis*. Thus, the said lactic acid bacterium was identified as *Bifidobacterium adolescentis*, named as *Bifidobacterium adolescentis* NK98, and deposited to the KCCM on Aug. 3, 2018 (accession number: KCCM12297P).

The physiological characteristics of *Bifidobacterium adolescentis* NK98 according to the present invention may be analyzed according to a conventional method in the art, wherein the results thereof are as shown in a following table 4. Particularly, *Bifidobacterium adolescentis* NK98 may use as a carbon source D-glucose, D-mannitol, D-lactose, D-saccharose, D-maltose, salicin, D-xylose, L-arabinose, gelatin, esculin ferric citrate, D-cellobiose, D-raffinose and D-trehalose.

In other aspect for achieving the said objectives, the present invention provides a pharmaceutical composition for preventing or treating a neurological mental disease, comprising a novel lactic acid bacterium.

In the present invention, the said novel lactic acid bacterium may be *Lactobacillus reuteri* NK33, *Bifidobacterium adolescentis* NK98 or a mixture thereof.

"*Lactobacillus reuteri* NK33" and "*Bifidobacterium adolescentis* NK98" according to the present invention are the same as described above.

Particularly, the lactic acid bacterium contained in the pharmaceutical composition according to the present invention may be a live bacterial cell thereof, a dead bacterial cell thereof, a culture product thereof, a crush thereof or an extract thereof, but any type of lactic acid bacterium may be used without limitation, as long as it may achieve a preventive or therapeutic effect on the neurological mental disease.

In the present invention, the term "culture product" means an object obtained by culturing a lactic acid bacterium in a known liquid medium or solid medium, and is a concept encompassing a novel lactic acid bacterium in the present invention.

A neurological mental disease according to the present invention may be a neurodegenerative disease or a mental disorder.

Particularly, the neurological mental disease according to the present invention may be the mental disorder, and the said mental disorder may be one or more selected from the group including anxiety, depression, mood disorder, insomnia, delusional disorder, obsessive disorder, migraine, stress, memory disorder, cognitive disorder and disturbance attention.

In an exemplary embodiment of the present invention, it was identified that, when *Lactobacillus reuteri* NK33 or *Bifidobacterium adolescentis* NK98 is administered to an animal model with stress induced, anxious and depressive behaviors caused by stress are remarkably reduced; an activity of NF-κB is inhibited in a hippocampus of the animal model with stress induced; an expression of a brain derived neurotrophic factor is increased; and amounts of corticosterone, IL-6, TNF-α and lipopolysaccharide (LPS), which are stress parameters in blood, are decreased. From the results, it was also identified that a pharmaceutical composition comprising the said lactic acid bacteria may be helpfully used in preventing or treating a neurological mental disease, particularly a mental disorder.

Particularly, the neurological mental disease according to the present invention may be a neurodegenerative disease, wherein the said neurodegenerative disease may be one or more selected from the group consisting of Parkinson's disease, Huntington's disease, Alzheimer's disease, amyotrophic lateral sclerosis, spinocerebellar atrophy, Tourette's syndrome, Friedrich's ataxia, Machado-Joseph's disease, dementia, dystonia, progressive supranuclear palsy and frontotemporal dementia.

In an exemplary embodiment of the present invention, it was identified that, when nerve cells are treated with the said lactic acid bacteria along with a stress hormone corticosterone, the activity of NF-κB, known as a substance of inducing neurodegenerative diseases such as Alzheimer's disease, is inhibited, and an expression of a brain derived neurotrophic factor (BDNF), known to be decreased in aging, dementia and the like, is increased at the same time (Tables 5 and 6). From the results, it was also identified that the pharmaceutical composition comprising the said lactic acid bacteria may be helpfully used in preventing and treating the neurological mental disease, particularly the neurodegenerative disease.

Also, in an exemplary embodiment of the present invention, it was identified that, when co-administered with *Lactobacillus reuteri* NK33 and *Bifidobacterium adolescentis* NK98, an effect of improving a neurological mental disease, particularly the effect of reducing stress, is remarkably increased compared to each group administered with the said lactic acid bacteria alone (Table 20).

In the present invention, the said pharmaceutical composition may further comprise *Bifidobacterium adolescentis* IM38 KCCM11807P.

The said *Bifidobacterium adolescentis* IM38 KCCM11807P is a known lactic acid bacterium disclosed in Korean patent publication No. 10-2017-0090359, and may be easily available based on Korean patent publication No. 10-2017-0090359.

In an exemplary embodiment of the present invention, it was identified that, when *Lactobacillus reuteri* NK33 or *Bifidobacterium adolescentis* NK98 and *Bifidobacterium adolescentis* IM38 are co-administered to an animal model with stress induced, anxious and depressive behaviors caused by stress are remarkably reduced, and an amount of corticosterone, which is a stress parameter in blood, is decreased.

In another aspect for achieving the said objectives, the present invention provides a pharmaceutical composition for preventing or treating an inflammatory disease, comprising *Lactobacillus reuteri* NK33, *Bifidobacterium adolescentis* NK98 or a mixture thereof.

"*Lactobacillus reuteri* NK33" and "*Bifidobacterium adolescentis* NK98" according to the present invention are the same as described above.

Particularly, the lactic acid bacterium contained in the pharmaceutical composition according to the present invention may be a live bacterial cell thereof, a dead bacterial cell thereof, a culture product thereof, a crush thereof or an extract thereof, but any type of a lactic acid bacterium may be used without limitation, as long as it may achieve a preventive or therapeutic effect on the inflammatory disease.

In the present invention, the term "culture product" means an object obtained by culturing a lactic acid bacterium in a known liquid medium or solid medium, and is a concept encompassing a novel lactic acid bacterium in the present invention.

An inflammatory disease according to the present invention may be one or more selected from the group including arthritis, gout, hepatitis, asthma, obesity, corneitis, gastritis, enteritis, nephritis, colitis, diabetes, tuberculosis, bronchitis, pleurisy, peritonitis, spondylitis, pancreatitis, inflammatory pain, urethritis, cystitis, vaginitis, arteriosclerosis, septicemia, burn, dermatitis, periodontitis and gingivitis.

In an exemplary embodiment of the present invention, it was identified that, when macrophage isolated from a mouse is treated with the said lactic acid bacteria along with lipopolysaccharide (LPS), an inflammatory reaction inducer, an inflammatory reaction is remarkably inhibited (Tables 5 and 6). From the results, it was also identified that the pharmaceutical composition comprising the said lactic acid bacteria according to the invention may be helpfully used in preventing and treating the inflammatory disease.

Particularly, the inflammatory disease may be colitis.

In an exemplary embodiment of the present invention, it was identified that, when *Lactobacillus reuteri* NK33 or *Bifidobacterium adolescentis* NK98 is administered to an animal model with colitis induced by stress, a colon length thereof, which is a colitis indicator, is recovered to a normal level, and amounts of myeloperoxidase, COX-2 and iNOS, which are colitis parameters, are decreased and an activity of TNF-α is decreased, too (FIG. 15 and Table 15). From the results, it was also identified that the pharmaceutical composition comprising the said *Lactobacillus reuteri* NK33 or *Bifidobacterium adolescentis* NK98 may be helpfully used in preventing and treating the inflammatory disease, particularly colitis.

A pharmaceutical composition for preventing or treating a neurological mental disease, or a pharmaceutical composition for preventing or treating an inflammatory disease according to the present invention may be prepared into a pharmaceutical dosage form by means of a well-known method in the art, such that an active component of such composition may be provided via a fast, suspended or prolonged release, after being administered to a mammal. In preparing a dosage form, the pharmaceutical composition according to the present invention may further comprise a pharmaceutically acceptable carrier, to the extent that such carrier does not suppress an activity of a novel lactic acid bacterium.

The pharmaceutically acceptable carrier may include, but not limited thereto, conventionally used ones, for example, lactose, dextrose, sucrose, sorbitol, mannitol, xylitol, erythritol, maltitol, starch, acacia rubber, alginate, gelatin, calcium phosphate, calcium silicate, cellulose, methyl cellulose, microcrystalline cellulose, polyvinyl pyrrolidone, water, methyl hydroxybenzoate, propylhydroxybenzoate, talc, magnesium stearate, mineral oil and the like. Also, the pharmaceutical composition according to the present invention may comprise a diluent or an excipient such as filler, extender, binder, humectant, disintegrant, surfactant, etc., and other pharmaceutically acceptable additives.

A dosage of the pharmaceutical composition according to the present invention needs to be a pharmaceutically effective amount. The "pharmaceutically effective amount" means an amount enough to prevent or treat neurological mental diseases or inflammatory diseases at a reasonable benefit/risk ratio applicable to medical treatment. An effective dose level may be variously selected by those skilled in the art according to such factors as a formulation method, a patient's condition and weight, the patient's gender, age and degree of disease, a drug form, an administration route and period, an excretion rate, reaction sensitivity, etc. The effective amount may vary depending on a route of treatment, a use of excipient and a possibility of being used with other drugs, as recognized by those skilled in the art. However, in case of a preparation for oral administration to achieve a preferable effect, the composition according to the present invention may be generally administered to an adult in an amount of 0.0001 to 100 mg/kg a day, preferably 0.001 to 100 mg/kg a day based on 1 kg of body weight. When such preparation is administered as shown above, *Lactobacillus reuteri* NK33 or *Bifidobacterium adolescentis* NK98 according to the present invention may be administered in an amount of $1 \times 10^2$ CFU/60 kg to $1 \times 10^{11}$ CFU/60 kg a day. Such administration may be done once a day, or divided into several times a day. The said dosage does not limit the scope of the present invention in any aspect.

The pharmaceutical composition for preventing or treating a neurological mental disease, or the pharmaceutical composition for preventing or treating an inflammatory disease according to the present invention may be administered to mammals such as mice, livestock, humans, etc. through various routes. Particularly, the pharmaceutical composition according to the present invention may be orally or parenterally administered (for example, applied or injected intravenously, subcutaneously or intraperitoneally), but may be preferably orally administered. A solid preparation for oral administration may include powder, granule, tablet, capsule, soft capsule, pill, etc. A liquid preparation for oral administration may include a suspending agent, liquid for internal use, emulsion, syrup, aerosol, etc., but may also include various excipients, for example, humectant, a sweetening agent, a flavoring agent, preservative, etc. in addition to water and liquid paraffin, which are frequently used simple diluents. A preparation for parenteral administration may be used by being formulated into a dosage form of external preparation and sterilized injectable preparation such as sterilized aqueous solution, liquid, non-aqueous solvent, a suspending agent, emulsion, eye drop, eye ointment, syrup, suppository, aerosol, etc., according to respective conventional methods, and preferably may be used by preparing a pharmaceutical composition of cream, gel, patch, spray, ointment, plaster, lotion, liniment, eye ointment, eye drop, paste or cataplasma, but not limited thereto. A preparation for local administration may be an anhydrous or aqueous form depending on a clinical prescription. As the non-aqueous solvent and the suspending agent above, propylene glycol, polyethylene glycol, vegetable oil like olive oil, injectable ester like ethyl oleate, etc. may be used. As a base of the suppository above, witepsol, macrogol, tween 61, cacao butter, laurin oil, glycerogelatin, etc. may be used.

In another aspect for achieving the said objectives, the present invention provides a method for preventing or treating a neurological mental disease, comprising a step of administering *Lactobacillus reuteri* NK33, *Bifidobacterium adolescentis* NK98 or a mixture thereof to an individual.

In another aspect for achieving the said objectives, the present invention provides a method for preventing or treating an inflammatory disease, comprising a step of administering *Lactobacillus reuteri* NK33, *Bifidobacterium adolescentis* NK98 or a mixture thereof to an individual.

The terms "*Lactobacillus reuteri* NK33," "*Bifidobacterium adolescentis* NK98," "administration," "neurological mental disease," "inflammatory disease" and the like according to the present invention are the same as described above.

The individual refers to an animal, and may be typically a mammal, on which treatment using the inventive novel lactic acid bacterium may show a beneficial effect. A preferable example of such individual may include primates like human, as well as a rat, mouse, monkey, dog, cat, cow, horse, pig, sheep or goat. Also, such individuals may include all the individuals having a symptom of a neurological mental disease or an inflammatory disease, or having a risk of having such symptom.

In another aspect for achieving the said objectives, the present invention provides a health functional food for preventing or improving a neurological mental disease, comprising *Lactobacillus reuteri* NK33, *Bifidobacterium adolescentis* NK98 or a mixture thereof.

In another aspect for achieving the said objectives, the present invention provides a health functional food for preventing or improving an inflammatory disease, comprising *Lactobacillus reuteri* NK33, *Bifidobacterium adolescentis* NK98 or a mixture thereof.

The terms "*Lactobacillus reuteri* NK33," "*Bifidobacterium adolescentis* NK98," "administration," "neurological mental disease," "inflammatory disease" and the like according to the present invention are the same as described above.

The health functional food, which puts an emphasis on a body modulating function of food, is a food given added value by means of a physical, biochemical or bioengineering method, such that the food may act to express the functions thereof for a particular purpose. A component of such health functional food is designed and processed to fully exert its body modulating function in vivo, which is involved in defending a living body, adjusting a body rhythm, preventing a disease and helping a recovery from the disease, and may comprise food supplementary additives, which are acceptable as food, sweeteners or functional raw materials.

In case of using *Lactobacillus reuteri* NK33 or *Bifidobacterium adolescentis* NK98 according to the present invention as a health functional food (or health functional beverage additives), the said lactic acid bacteria may be added thereto as they are, used along with other food or food components, or appropriately used according to a conventional method. A mixed amount of the said lactic acid bacteria may be appropriately determined depending on a purpose of use thereof (prevention, health, improvement or therapeutic treatment).

The health functional food may comprise various nutrients, vitamins, minerals (electrolytes), flavoring agents such as synthetic flavoring agents, natural flavoring agents and the like, coloring agents and enhancers (cheese, chocolate, etc.), pectic acid and salts thereof, organic acid, protective colloidal thickeners, pH adjusting agents, stabilizers, preservatives, glycerin, alcohol, carbonators used in carbonated beverages, etc. Also, the health functional food according to the present invention may comprise pulp for preparing fruit and vegetable based beverages. Such components may be used alone or in combination, and a ratio of such additives is generally selected from a range of 0.001 to 50 parts by weight with regard to a total weight of the composition.

A type of the health functional food has no particular limitation. As food, to which the said lactic acid bacteria may be added, there are sausage, meats, bread, chocolates, snacks, candies, confectionery, ramen, pizza, other noodles, chewing gums, dairy products including ice creams, various soups, beverages, teas, health drinks, alcohol beverages, vitamin complexes, etc. In case of being formulated into beverages, a liquid component, which is added to the beverages in addition to the novel lactic acid bacteria, may include, but not limited thereto, various flavors, natural carbohydrates or the like as an additional component just as contained in conventional beverages. The aforementioned natural carbohydrates may be monosaccharide (ex. glucose, fructose, etc.), disaccharide (ex. maltose, sucrose, etc.) and polysaccharide (ex. conventional sugar such as dextrin, cyclodextrin, etc.), as well as sugar alcohol such as xylitol, sorbitol, erythritol, etc.

In another aspect for achieving the said objectives, the present invention provides a composition for diagnosing a neurological mental disease, comprising a preparation for measuring a level of intestinal microorganisms.

The terms such as "neurological mental disease," etc. according to the present invention are the same as described above.

In the present invention, the term "intestinal microorganism" refers to a microorganism present in a digestive tract, particularly the microorganism present specifically in intestines, wherein such intestinal microorganism may be one or more selected from the group including bacteroidetes, actinobacteria, firmicutes, bifidobacteria, lactobacilli, $\beta$-proteobacteria, $\delta$-proteobacteria, $\gamma$-proteobacteria, $\epsilon$-proteobacteria and enterobacteriaceae.

Particularly, a composition for diagnosis according to the present invention may diagnose a neurological mental disease, if there is an increase in a level of one or more selected from the group including $\beta$-proteobacteria, $\delta$-proteobacteria, $\gamma$-proteobacteria, $\epsilon$-proteobacteria and enterobacteriaceae among the said intestinal microorganisms; such composition may diagnose the neurological mental disease, if there is a decrease in a level of one selected from the group including bacteroidetes, actinobacteria, firmicutes, bifidobacteria and lactobacilli among the said intestinal microorganisms; and such composition may diagnose the neurological mental disease, if there is an increase in a level of one or more selected from the group including $\beta$-proteobacteria, $\delta$-proteobacteria, $\gamma$-proteobacteria, $\epsilon$-proteobacteria and enterobacteriaceae among the said intestinal microorganisms, and if there is a decrease in a level of one selected from the group including bacteroidetes, actinobacteria, firmicutes, bifidobacteria and lactobacilli among the said intestinal microorganisms.

Particularly, the said enterobacteriaceae, of which level is increased, may be one or more selected from the group including *Klebsiella oxytoca*, *Escherichia coli* and *Morganella morganii*.

Also, the said lactobacilli, of which level is decreased, may be one or more selected from the group including *Lactobacillus reuteri*, *Lactobacillus johnsonii* and *Lactobacillus rhamnosus*, and the said bifidobacteria, of which level is decreased, may be *Bifidobacterium animalis*.

The composition for diagnosing a neurological mental disease, provided in the present invention, comprises a preparation capable of measuring a level of an intestinal microorganisms, wherein an occurrence of the neurological mental disease to an individual may be identified by measuring the level of the intestinal microorganism from feces isolated from the individual, who needs to be identified about the occurrence of the neurological mental disease, by means of the preparation contained in the said composition. The said individual may be an animal, preferably a mammal, for example, primates like human, as well as a rat, mouse, monkey, dog, cat, cow, horse, pig, sheep or goat.

The preparation may be used to identify whether the neurological mental disease has occurred to the individual or not, by measuring the level of the intestinal microorganism isolated from feces of the said individual.

The preparation capable of measuring the said level of the intestinal microorganism may be particularly a primer, probe or the like, capable of measuring a level of a specific gene of the intestinal microorganism; may be an antibody, aptamer or the like, capable of measuring a level of a protein expressed from the said specific gene; may be a primer, probe or the like, to quantitatively analyze a 16S rDNA sequence of the intestinal microorganism; and may be a preparation for pyrosequencing, etc. to quantitatively analyze a genome DNA sequence of the intestinal microorganism, but not particularly limited thereto, as long as the preparation may be used to quantitatively analyze the intestinal microorganism isolated from feces of the individual.

Particularly, a primer specific to firmicutes, the said intestinal microorganism, may be a primer pair consisting of SEQ ID NO: 2 and SEQ ID NO: 3; a primer specific to bacteroidetes may be a primer pair consisting of SEQ ID NO: 4 and SEQ ID NO: 5; a primer specific to β-proteobacteria may be a primer pair consisting of SEQ ID NO: 6 and SEQ ID NO: 7; a primer specific to δ/γ-proteobacteria may be a primer pair consisting of SEQ ID NO: 8 and SEQ ID NO: 9; a primer specific to ε-proteobacteria may be a primer pair consisting of SEQ ID NO: 10 and SEQ ID NO: 11; a primer specific to actinobacteria may be a primer pair consisting of SEQ ID NO: 12 and SEQ ID NO: 13; and a primer specific to enterobacteriaceae may be a primer pair consisting of SEQ ID NO: 18 and SEQ ID NO: 19.

In an exemplary embodiment of the present invention, the levels of intestinal microorganisms were measured by carrying out pyrosequencing by means of a preparation for pyrosequencing containing a barcoded primer of SEQ ID NO: 2 to SEQ ID NO: 19 in Table 1 (Experimental Example 3).

The composition according to the present invention may further comprise a preparation for measuring an amount of lipopolysaccharide (LPS). Particularly, the preparation for measuring the said amount of lipopolysaccharide (LPS) may be a preparation conventionally used to measure the amount of lipopolysaccharide (LPS), more particularly a preparation included in Limulus amoebocyte lysate (LAL) assay kit, but not limited thereto.

In an exemplary embodiment of the present invention, it was identified that the amount of lipopolysaccharide (LPS) is increased as a result of analyzing feces of an animal model with a mental disorder induced (FIGS. 1, 2, 7 and 11).

In another aspect, the present invention provides a kit for diagnosing a neurological mental disease, comprising the said composition.

The kit according to the present invention may include a collection container capable of collecting feces of an individual to be identified about an occurrence of the neurological mental disease thereto by using the said composition; a buffer solution for extracting an intestinal microorganism in feces; a measurement means used to measure the intestinal microorganism; and the like.

In another aspect, the present invention provides a method for diagnosing a neurological mental disease, comprising: a step of measuring a level of an intestinal microorganism from feces isolated from an individual suspicious about the neurological mental disease; and a step of comparing the level of the said intestinal microorganism with a level of the intestinal microorganism in feces of a control group, rather than that of the neurological mental disease.

Also, the present invention provides an information-offering method for diagnosing a neurological mental disease, comprising: a step of measuring a level of an intestinal microorganism from feces isolated from an individual suspicious about the neurological mental disease; and a step of comparing the level of the said intestinal microorganism with a level of the intestinal microorganism in feces of a control group, rather than that of the neurological mental disease.

The feces mean feces isolated and collected from an individual as a sample for measuring a level of an intestinal microorganism.

Particularly, the intestinal microorganism may be one or more selected from the group including bacteroidetes, actinobacteria, firmicutes, bifidobacteria, lactobacilli, β-proteobacteria, δ-proteobacteria, γ-proteobacteria, ε-proteobacteria and enterobacteriaceae.

The method for diagnosing a neurological mental disease or providing information thereon according to the present invention may diagnose whether the neurological mental disease occurs or has a risk of occurrence by identifying a microorganism, of which level is increased, among the said intestinal microorganisms.

Particularly, the method for diagnosing a neurological mental disease or providing information thereon may further comprise a step of determining an individual, whose level of an intestinal microorganism is increased, as the neurological mental disease by comparing the level of the intestinal microorganism in feces of an individual suspicious about the neurological mental disease with a level of the intestinal microorganism in feces of a control group, rather than that of the neurological mental disease.

The intestinal microorganism, of which level is increased, may be one or more selected from the group including β-proteobacteria, δ-proteobacteria, γ-proteobacteria, ε-proteobacteria and enterobacteriaceae.

Particularly, the enterobacteriaceae may be one or more selected from the group including *Klebsiella oxytoca*, *Escherichia coli* and *Morganella morganii*.

Also, the method for diagnosing a neurological mental disease or providing information thereon according to the invention may diagnose whether the neurological mental disease occurs or has a risk of occurrence by identifying a microorganism, of which level is decreased, among the said intestinal microorganisms.

The terms such as "neurological mental disease," etc. according to the present invention are the same as described above.

Particularly, the method for diagnosing a neurological mental disease or providing information thereon may further comprise a step of determining an individual, whose level of an intestinal microorganism is decreased, as the neurological mental disease by comparing a level of the intestinal microorganism in feces of an individual suspicious about the neurological mental disease with a level of the intestinal microorganism in feces of a control group, rather than that of the neurological mental disease.

The intestinal microorganism, of which level is decreased, may be one or more selected from the group including bacteroidetes, actinobacteria, firmicutes, bifidobacteria and lactobacilli.

Also, the lactobacilli may be one or more selected from the group including *Lactobacillus reuteri, Lactobacillus johnsonii* and *Lactobacillus rhamnosus*, and the bifidobacteria may be *Bifidobacterium animalis*.

In an exemplary embodiment of the present invention, as a result of identifying a change in an intestinal microbial community by using feces isolated from an animal model with stress induced, such as immobilization stress, antibiotic stress or the like, it was identified that levels of β-proteobacteria, δ-proteobacteria, γ-proteobacteria, ε-proteobacteria and enterobacteriaceae are increased, and levels of bacteroidetes, actinobacteria, firmicutes, bifidobacteria and lactobacilli are decreased compared to an animal model without stress (FIGS. 2, 6, 8, 10 and 12). In particular, it was identified that, as a particular enterobacteriaceae, of which level is increased, there are *Klebsiella oxytoca, Escherichia coli* and *Morganella morganii*; as a particular lactobacilli, of which level is decreased, there are *Lactobacillus reuteri, Lactobacillus johnsonii* and *Lactobacillus rhamnosus*; and as a particular bifidobacteria, of which level is decreased, there is *Bifidobacterium animalis*.

In another aspect, the present invention provides a use of a novel lactic acid bacterium for preventing or treating a neurological mental disease. Particularly, the present invention provides a use of *Lactobacillus reuteri* NK33 for preventing or treating the neurological mental disease. Also, the present invention provides a use of *Bifidobacterium adolescentis* NK98 for preventing or treating the neurological mental disease.

In another aspect, the present invention provides a use of a novel lactic acid bacterium for preventing or treating an inflammatory disease. Particularly, the present invention provides a use of *Lactobacillus reuteri* NK33 for preventing or treating the inflammatory disease. Also, the present invention provides a use of *Bifidobacterium adolescentis* NK98 for preventing or treating the inflammatory disease.

In another aspect, the present invention provides a use of a composition comprising a novel lactic acid bacterium in preparing a drug for preventing or treating a neurological mental disease. Particularly, the present invention provides a use of a composition comprising *Lactobacillus reuteri* NK33 in preparing a drug for preventing or treating the neurological mental disease. Also, the present invention provides a use of a composition comprising *Bifidobacterium adolescentis* NK98 in preparing a drug for preventing or treating the neurological mental disease.

The terms "*Lactobacillus reuteri* NK33," "*Bifidobacterium adolescentis* NK98," "neurological mental disease," "inflammatory disease" and the like according to the present invention are the same as described above.

The numerical values described in the present specification should be interpreted to include a range of equivalents thereof, unless otherwise stated.

Hereinafter, the present invention will be described in detail through preferred Examples for better understanding of the present invention. However, the following Examples are provided only for the purpose of illustrating the present invention, and thus the present invention is not limited thereto.

Advantageous Effects

A novel lactic acid bacterium according to the present invention, i.e. *Lactobacillus reuteri* NK33 or *Bifidobacterium adolescentis* NK98 has an effect on inhibiting a neurodegenerative disease-inducing factor and reducing anxious and depressive behaviors. Thus, the novel lactic acid bacterium according to the present invention may be used as a composition for preventing or treating a neurological mental disease, and particularly effective in preventing and treating a neurodegenerative disease and a mental disorder.

Also, the novel lactic acid bacterium according to the present invention is effective in inhibiting an inflammatory reaction, and thus may be used in a composition for preventing or treating an inflammatory disease, and particularly effective in preventing and treating colitis.

Further, a composition for measuring a level of intestinal microorganisms according to the present invention is effective in diagnosing a neurological mental disease by measuring the level of intestinal microorganisms.

BRIEF DESCRIPTION OF THE DRAWINGS

FIG. 2 (*b*) is a graph of identifying that there is an increase in lipopolysaccharide (LPS) in feces of a mouse (IS) subjected to immobilization stress.

FIG. 8 (b) is a graph of identifying that there is an increase in lipopolysaccharide (LPS) in feces of a mouse (AP) subjected to antibiotic stress.

FIG. 10 (B) is a diagram of identifying which bacterium is decreased as a result of culturing feces of the mouse (IS) subjected to immobilization stress and feces of the mouse (AP) subjected to antibiotic stress in a selective medium.

FIG. 12 (b) is a graph of identifying that there is an increase in lipopolysaccharide (LPS) in feces of a mouse (KO) administered with *Klebsiella oxytoca*.

MODE FOR INVENTION

Figure 1:
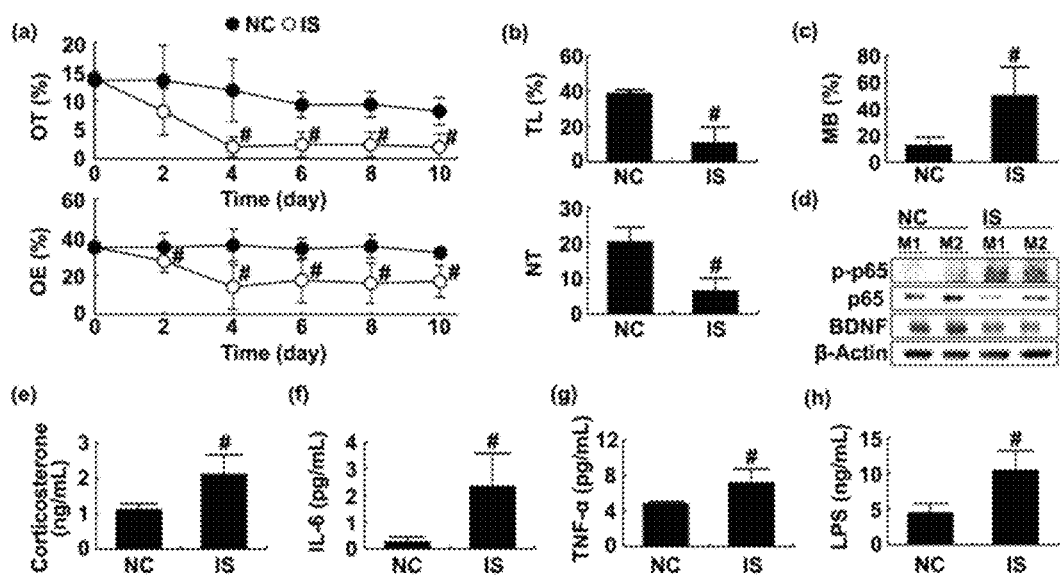
FIG. 1 shows results of measuring anxious behaviors and blood indicators with regard to a mouse (IS) subjected to immobilization stress; (a) is a graph of identifying that time spent in open arms (OT) and open arm entries (OE) are decreased as a result of an elevated plus maze test; (b) is a graph of identifying that time in bright area is decreased as a result of a light/dark transition test; (c) is a graph of identifying that a marble-burying behavior is increased in a marble burying test; (d) is an image of identifying that an NF-κB activity (p-p65/p65) is increased in a hippocampus and an expression level of a brain derivated neurotrophic factor (BDNF) is decreased; (e) is a graph of identifying that corticosterone in blood is increased; (f) is a graph of identifying that IL-6 in blood is increased; (g) is a graph of identifying that TNF-α in blood is increased; and (h) is a graph of identifying that lipopolysaccharide (LPS) in blood is increased.

Hereinafter, the present invention will be described in detail through preferred Examples and Experimental Examples for better understanding of the present invention. However, the following Examples and Experimental Examples are provided only for the purpose of illustrating the present invention, and thus the present invention is not limited thereto.

Experimental Example 1. Animal Model with a Mental Disorder Induced

(1) Immobilization Stress

In order to induce a mental disorder such as anxiety, depression, stress or the like, a mouse was fixed to a 3×10 cm cylindrical-shaped immobilization stress apparatus, such that the mouse may not move therein at all.

Particularly, in order to prepare a mouse with anxiety induced by immobilization stress, the said mouse, which had been fixed to the apparatus, was repeatedly subjected to immobilization stress five times, in such a way that the mouse was held with its head up for two hours once every other day, and then a behavioral experiment was performed in two hours after a final immobilization stress.

Also, in order to prepare a mouse with depression induced by immobilization stress, the said mouse, which had been fixed to the apparatus, was repeatedly subjected to continuous immobilization stress once daily for two days, in such a way that the mouse was held with its head up for 12 hours. A lactic acid bacterium was administered once daily for five days, and a behavioral experiment was performed in one hour after a final administration.

(2) Antibiotic Stress

In order to induce a mental disorder such as anxiety, depression, stress or the like, a mouse was administered ampicillin (100 mg/kg) for two days in a row. An anxiety behavior was measured in 10 days after administration.

(3) Experimental Method on an Animal Model with a Mental Disorder Induced

For a mouse model with immobilization stress induced, a lactic acid bacterium or physiological saline solution was administered thereto depending on an experimental group once daily for three days from Day 7 after starting the immobilization stress. For a mouse model with antibiotic stress induced, a lactic acid bacterium or physiological saline solution was administered thereto depending on an experimental group once daily for three days from Day 7 after starting the antibiotic stress.

An anxiety behavior was measured in five hours after administering the lactic acid bacterium or physiological saline solution, and blood indicators (corticosterone, IL-6, TNF-α, etc.) were measured by collecting blood in one hour after finishing an elevated plus maze test.

Experimental Example 2. Behavior Measurement Method for Stress Diagnosis

(1) Elevated Plus Maze (EPM) Test

An elevated plus maze is an experimental apparatus to measure a degree of a mental disorder such as stress, anxiety or the like. An elevated plus maze experimental apparatus used in the present experiment is a black plexiglass apparatus, in which two open arms (30×7 cm) and two enclosed arms (30×7 cm) with 20 cm-high walls stand 50 cm high above a floor, each extending 7 cm away from a center platform. In the present test, a mouse was placed in the elevated plus maze in a room, where a video camera of 20 Lux was installed high up there, and then a movement of the mouse was recorded.

Particularly, a C57BL/6 mouse (male, 19-22 g) was placed in the middle of the elevated plus maze, in such a way that a head of the mouse faced toward an open arm. Time spent in open and closed arms as well as the number of arm entries were measured for five minutes. An arm entry was defined as a case in which the mouse entered an arm with all four feet.

Out of a whole test time, the time spent in open arms (OT) was calculated via [Time spent in open arms (OT)/(Time spent in open arms (OT)+Time spent in closed arms)]×100. And open arm entries (OE) were calculated via [Open arm entries (OE)/(Open arm entries (OE)+Closed arm entries)]×100. After the end of each behavioral experiment, remaining smell was eliminated by means of 70% ethanol.

According to a known interpretation of test results, it was interpreted that a mental disorder symptom such as anxiety, depression or the like occurs, if OT and OE decrease.

(2) Light/Dark Transition Test

An apparatus used for a light/dark transition test consisted of a bright area (21×42×25 cm, 390 Lux white diode) and a dark area (21×42×25 cm, 2 Lux), which were of a size and partitioned off with a door (7.5×7.5 cm). A mouse was placed in a bright area and observed for five minutes, during which time in bright area and the number of transitions into the bright area were measured. After the end of each behavioral experiment, remaining smell was eliminated by means of 70% ethanol.

According to a known interpretation of test results, it was interpreted that a mental disorder symptom such as anxiety, depression or the like occurs, if the time in bright area and the number of transitions into the bright area decrease.

(3) Marble Burying Test

A mouse was placed in a transparent cage filled with sawdust 5 cm deep, and stayed there for 15 minutes. Then, 25 marbles (transparent, 2 cm in diameter) were placed on the sawdust at an interval of 5 cm. The mouse was placed again in the middle of one side and the number of marbles that the mouse buried for 30 minutes was measured.

According to a known interpretation of test results, it was interpreted that a mental disorder symptom such as anxiety, depression or the like occurs, if the mouse's behavior of burying and hiding marbles increases.

(4) Forced Swimming Test (FST)

According to a method of Porsolt et al. (Porsolt R D, Le Pichon, Jalfre M (1977) Depression: A new animal model sensitive to antidepressant treatments, Nature, Vol. 266; pp. 730-732), water at 25±1° C. was filled into a water tank 40 cm in height and 20 cm in diameter, until a water level reached 25 cm high. A laboratory mouse was put into each tank and stayed there for total six minutes, out of which first two minutes were not measured as an adaptive time, and then for the last four minutes, an immobility time of the laboratory animal was measured. The immobility means a state that the mouse is floating in the water motionlessly except the least movement to keep its head only above the water.

(5) Tail Suspension Test (TST)

According to a method of Steru et al. (Steru L, Chermat R, Thierry B, Simon P (1985) The tail suspension test: A new method for screening antidepressants in mice, Psychopharmacology, Vol. 85; pp. 367-370), a mouse was hanged up in a container 35 cm in diameter and 50 cm in height by placing a fixing device approximately 1 cm from the tip of a tail thereof of a mouse, such that the mouse was suspended 50 cm above a floor. For six minutes in total, an immobility time of the laboratory animal was measured.

Experimental Example 3. Experiment on Identification of an Intestinal Microbial Community A real-time PCR or 454 pyrosequencing was performed to measure the shares of firmicutes, proteobacteria, actinobacteria, bacteroidetes and the like in an intestinal microbial community.

Particularly, DNA of feces obtained from an animal model was isolated by means of QIAamp DNA stool mini kit (Qiagen, Germany). Pyrosequencing was performed by means of a barcoded primer (V1 to V3 domains of a bacterial 16S rDNA gene). qPCR was analyzed by means of a primer shown in a following table 1.

TABLE 1

| Type | | Sequence (5'-3') |
|---|---|---|
| Firmicutes | Forward (F) | (SEQ ID NO: 2) GGA GYA TGT GGT TTA ATT CGA AGC A |
| | Reverse (R) | (SEQ ID NO: 3) AGC TGA CGA CAA CCA TGC AC |
| Bacteroidetes | Forward (F) | (SEQ ID NO: 4) GTT TAA TTC GAT GAT ACG CGA G |
| | Reverse (R) | (SEQ ID NO: 5) TTA ASC CGA CAC CTC ACG G |
| β-Proteobacteria | Forward (F) | (SEQ ID NO: 6) AAC GCG AAA AAC CTT ACC TAC C |
| | Reverse (R) | (SEQ ID NO: 7) TGC CCT TTC GTA GCA ACT AGT G |
| δ/γ-Proteobacteria | Forward (F) | (SEQ ID NO: 8) GCT AAC GCA TTA AGT RYC CCG |
| | Reverse (R) | (SEQ ID NO: 9) GCC ATG CRG CAC CTG TCT |
| ε-Proteobacteria | Forward (F) | (SEQ ID NO: 10) TAG CTT GCA CAT TGA TAG AAT C |
| | Reverse (R) | (SEQ ID NO: 11) CTT ACG AAG GCA GTC TCC TTA |
| Actinobacteria | Forward (F) | (SEQ ID NO: 12) TGT AGC GGT GGA ATG CGC |
| | Reverse (R) | (SEQ ID NO: 13) AAT TAA GCC ACA TGC TCC GCT |
| TM | Forward (F) | (SEQ ID NO: 14) AYT GGG CGT AAA GAG TTG C |
| | Reverse (R) | (SEQ ID NO: 15) TAC GGY TAC CTT GTT ACG ACT T |
| Verrucomicrobia | Forward (F) | (SEQ ID NO: 16) TCA KGT CAG TAT GGC CCT TAT |
| | Reverse (R) | (SEQ ID NO: 17) CAG TTT TYA GGA TTT CCT CCG CC |
| Enterobacteriaceae | Forward (F) | (SEQ ID NO: 18) CAT TGA CGT TAC CCG CAG AAG AAG C |
| | Reverse (R) | (SEQ ID NO: 19) CTC TAC GAG ACT CAA GCT TGC |
| Escherichia coli | Forward (F) | (SEQ ID NO: 20) CGC GTA CTA TAC GCC ATG AAC GTA |
| | Reverse (R) | (SEQ ID NO: 21) ACC GTT GAT CAC TTC GGT CAG G |
| Klebsiella spp. | Forward (F) | (SEQ ID NO: 22) GAT ACG GAG TAT GCC TTT ACG GTG |
| | Reverse (R) | (SEQ ID NO: 23) TAG CCT TTA TCA AGC GGA TAC TGG |
| Klebsiella oxytoca | Forward (F) | (SEQ ID NO: 24) GTT AAT ACC TTT GCT CAT TGA |
| | Reverse (R) | (SEQ ID NO: 25) ACC AGG GTA TCT AAT CCT GTT |
| Morganella morganii | Forward (F) | (SEQ ID NO: 26) CTC GCA CCA TCA GAT GAA CCC ATA T |
| | Reverse (R) | (SEQ ID NO: 27) CAA AGC ATC TCT GCT AAG TTC TCT GGA TG |
| Lactobacillus reuteri | Forward (F) | (SEQ ID NO: 28) GAA CGC AYT GGC CCA A |
| | Reverse (R) | (SEQ ID NO: 29) TCC ATT GTG GCC GAT CAG T |
| Lactobacillus johnsonii | Forward (F) | (SEQ ID NO: 30) CAC TAG ACG CAT GTC TAG AG |
| | Reverse (R) | (SEQ ID NO: 31) AGT CTC TCA ACT CGG CTA TG |
| Lactobacillus plantarum | Forward (F) | (SEQ ID NO: 32) TCA TGA TTT ACA TTT GAG TG |
| | Reverse (R) | (SEQ ID NO: 33) GAC CAT GCG GTC CAA GTT GTT |
| Lactobacillus rhamnosus | Forward (F) | (SEQ ID NO: 34) CGC CCT TAA CAG CAG TCT TC |
| | Reverse (R) | (SEQ ID NO: 35) GCC CTC CGT ATG CTT AAA CC |
| Bacterial 16S rDNA | Forward (F) | (SEQ ID NO: 36) TCG TCG GCA GCG TCA GAT GTG TAT AAG AGA CAG GTG CCA GCM GCC GCG GTA A |
| | Reverse (R) | (SEQ ID NO: 37) GTC TCG TGG GCT CGG AGA TGT GTA TAA GAG ACA GGG ACT ACH VGG GTW TCT AAT |

Experimental Example 4. Method for Measuring Lipopolysaccharide (1) Method for Measuring Lipopolysaccharide in Feces Feces (20 mg) were suspended in 30 mL of PBS, then microorganisms thereof were crushed by means of ultrasonic treatment for one hour, and then centrifuged at 500 rpm for 15 minutes. A resulting supernatant was filtered with a 0.45 µm filter, then filtered again with a 0.22 µm filter, then treated at 70° C. for 10 minutes, and then used as a specimen. For the said specimen, lipopolysaccharide was measured by means of Limulus amoebocyte lysate (LAL) assay kit (Cape Cod Inc., East Falmouth, MA, U.S.A.).

(2) Method for Measuring Lipopolysaccharide in Blood

Blood was diluted 10 times with PBS, then centrifuged, and then a resulting supernatant was treated at 0° C. for 10 minutes. A resulting supernatant was filtered with a 0.45 µm filter, then filtered again with a 0.22 µm filter, and then used as a specimen. For the said specimen, lipopolysaccharide was measured by means of Limulus amoebocyte lysate (LAL) assay kit (Cape Cod Inc., East Falmouth, MA, U.S.A.).

Experimental Example 5. Method for Measuring Colitis Indicators (1) Measurement of Myeloperoxidase Activity 200 µl of 10 mM potassium phosphate buffer, pH 7.0 containing 0.5% hexadecyl trimethyl ammonium bromide was put into 100 mg of a colon tissue, and then subjected to homogenization. A resulting mixture was centrifuged for 10 minutes on condition of 4° C. and 10,000 g, so as to obtain a supernatant. 50 µl of the supernatant was put into 0.95 ml of a reaction solution (containing 1.6 mM tetramethyl benzidine and 0.1 mM $H_2O_2$), then subjected to reaction at 37° C., and then an observance was microscopically measured at 650 nm. An activity of the said myeloperoxidase (MPO) was calculated with a resulting reactant $H_2O_2$ 1 µmol/ml=1 unit.

(2) Measurement of Inflammatory Indicators

Inflammatory reaction biomarkers such as p-p65, p65, iNOS, COX-2 and β-actin were measured by means of a western blotting method. Particularly, 50 µg of supernatant, which had been obtained by the same method as shown in the said experiment for measuring the activity of myeloperoxidase (MPO), was taken and then immune blotting was performed thereon. Also, an expression level of cytokines was measured by means of ELISA kit, and LPS was measured by means of LAL assay kit.

Example 1: Identification of a State of an Animal Model with Immobilization Stress Induced According to Experimental Examples 2 to 5, an experiment was performed on a mouse (IS), which had been subjected to immobilization stress once every other day for five times in total by the same method as shown in the Experimental Example 1-(1) above.

As a result of performing Experimental Example 2, it was identified that time spent in open arms (OT) and open arm entries (OE) are decreased in an elevated plus maze test; time in bright area is decreased in a light/dark transition test; and a marble-burying behavior is increased in a marble burying test (FIGS. 1 (a) to (c)).

Also, as a result of identifying with western blotting, it was identified that an NF-κB activity (p-p65/p65) is increased in a hippocampus; an expression level of a brain derivated neurotrophic factor (BDNF) is decreased (FIG. 1 (d)); and amounts of corticosterone, IL-6, TNF-α and lipopolysaccharide in blood are increased (FIGS. 1 (e) to (h)).

Figure 2:
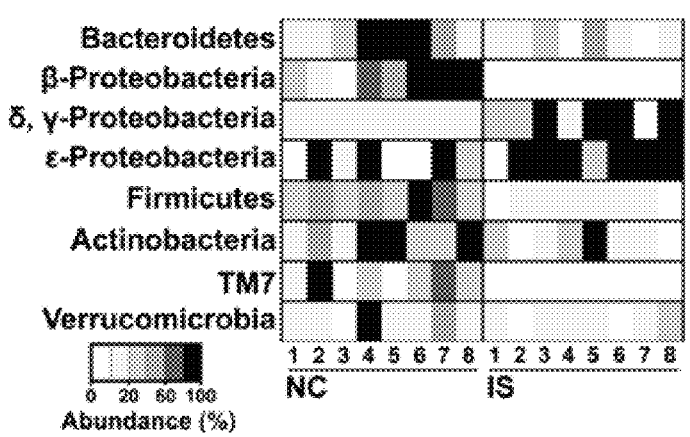
FIG. 2 (*a*) is a diagram of identifying that there is a change in an intestinal microbial community in feces of a mouse (IS) subjected to immobilization stress.
Figure 2:
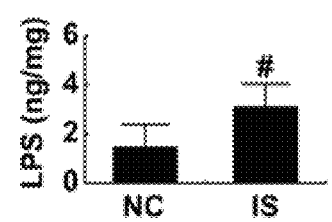

As a result of performing Experimental Example 3, it was identified that bacteroidetes, actinobacteria and firmicutes in feces are decreased and δ, γ-proteobacteria and ε-proteobacteria are increased. As a result of performing Experimental Example 4, it was identified that lipopolysaccharide in feces is increased (FIG. 2).

Figure 3:
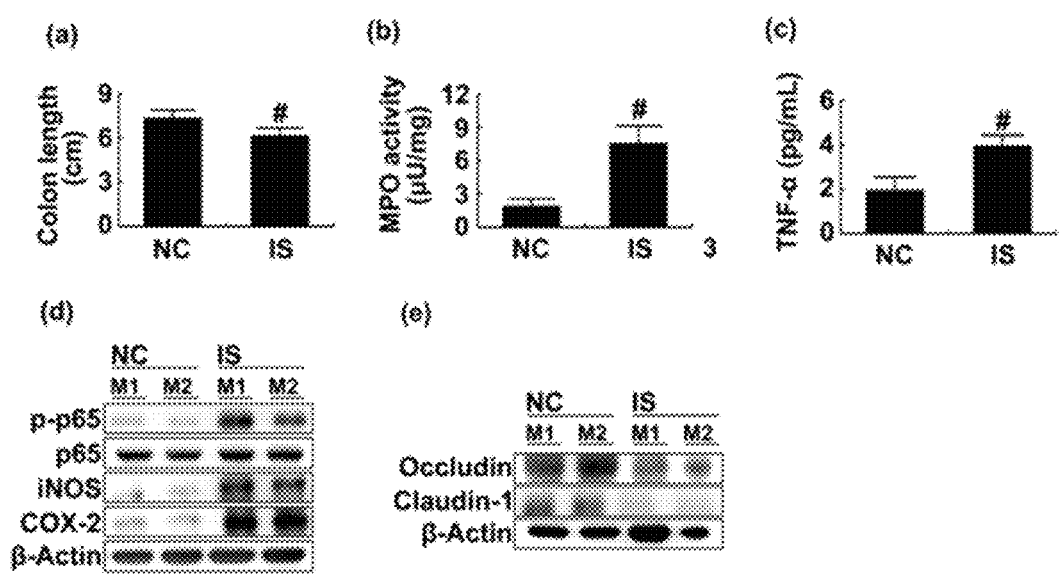
FIG. 3 shows results of measuring colitis indicators with regard to a mouse (IS) subjected to immobilization stress; (a) is a graph of identifying that there is a decrease in a length of a colon of a mouse (IS) subjected to immobilization stress; (b) is a graph of identifying that myeloperoxidase is increased in the colon; (c) is a graph of identifying that TNF-α is increased in the colon; (d) is an image of identifying that an NF-κB activity (p-p65/p65) is increased and expressions of COX-2 and iNOS are increased in the colon; and (e) is an image of identifying that occludin and claudin-1 are decreased in the colon.

As a result of performing Experimental Example 5, it was identified that as indicators of colitis, a length of a colon is decreased; myeloperoxidase is increased; TNF-α of the colon is increased; expressions of COX-2 and iNOS of the colon are increased; an NF-κB activity is increased; and occludin and claudin-1, tight junction proteins, are decreased (FIGS. 3 (a) to (e)).

Example 2: Identification of a State of an Animal Model Administered with Feces of the Animal Model with Immobilization Stress Induced According to Experimental Examples 2 to 4, an experiment was performed on a mouse (FIS), which was administered with feces of a mouse, which had been subjected to immobilization stress once every other day for five times in total by the same method as shown in the Experimental Example 1-(1) above.

Figure 4:
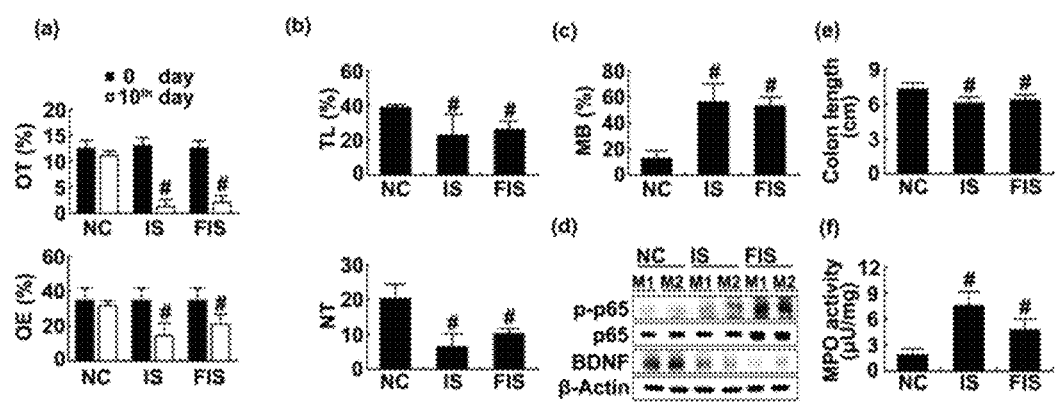
FIG. 4 shows results of identifying a state of an animal model (FIS), administered with feces of an animal model with immobilization stress induced; (a) is a graph of identifying that time spent in open arms (OT) and open arm entries (OE) are decreased as a result of an elevated plus maze test; (b) is a graph of identifying that time in bright area is decreased as a result of a light/dark transition test; (c) is a graph of identifying that a marble-burying behavior is increased in a marble burying test; (d) is an image of identifying that an NF-κB activity (p-p65/p65) is increased in a hippocampus and an expression level of a brain derivated neurotrophic factor (BDNF) is decreased; (e) is a graph of identifying that a length of a colon is decreased; and (f) is a graph of identifying that myeloperoxidase is increased in the colon.

As a result of performing Experimental Example 2, it was identified that OT and OE are decreased in an elevated plus maze test; time in bright area is decreased in a light/dark transition test; and a marble-burying behavior is increased in a marble burying test (FIGS. 4 (a) to (c)).

Figure 5:
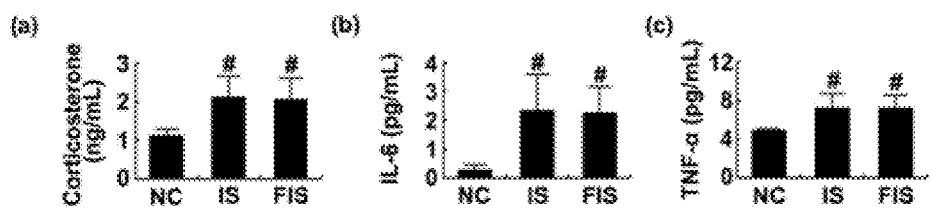
FIG. 5 shows results of measuring blood indicators with regard to an animal model (FIS) administered with feces of an animal model with immobilization stress induced; (a) is a graph of identifying that corticosterone in blood is increased; (b) is a graph of identifying that IL-6 in blood is increased; and (c) is a graph of identifying that TNF-α in blood is increased.

As a result of identifying with western blotting, it was identified that an NF-κB activity (p-p65/p65) is increased in a hippocampus; an expression level of a brain derived neurotrophic factor (BDNF) is decreased (FIG. 4 (d)); and amounts of corticosterone, IL-6 and TNF-α in blood are increased (FIGS. 5 (a) to (c)).

As a result of performing Experimental Example 5, it was identified that as indicators of colitis, a length of a colon is decreased; myeloperoxidase is increased (FIGS. 4 (e) and (f)); TNF-α and IL-6 of the colon are increased; IL-10 of the colon is decreased; expressions of COX-2 and iNOS of the colon are increased; and an NF-κB activity is increased (FIGS. 6 (a) to (d)).

Figure 6:
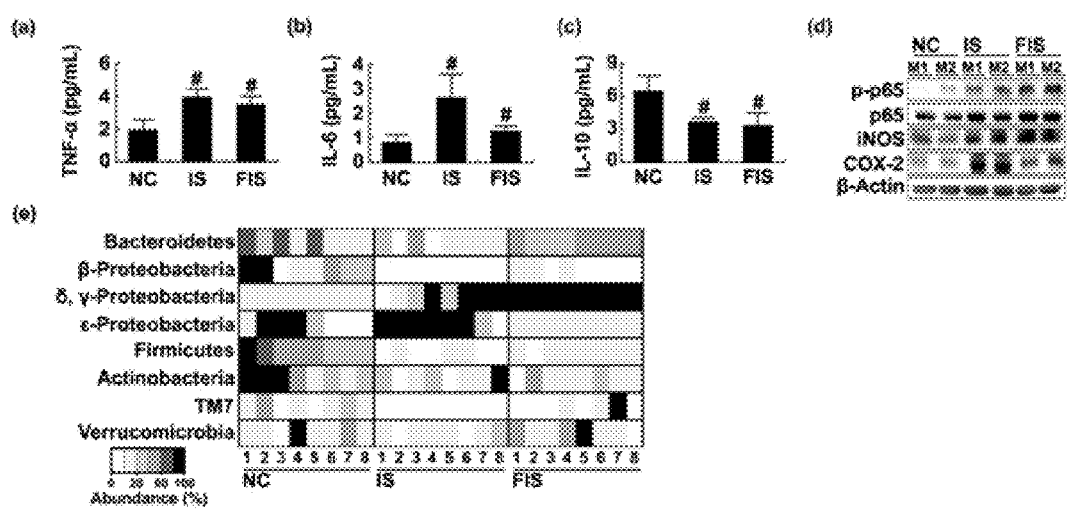
FIG. 6 shows results of identifying a change in colitis indicators and an intestinal microbial community with regard to an animal model (FIS) administered with feces of an animal model with immobilization stress induced; (a) is a graph of identifying that TNF-α is increased; (b) is a graph of identifying that IL-6 is increased in a colon; (c) is a graph of identifying that IL-10 is decreased in the colon; (d) is an image of identifying that an NF-κB activity (p-p65/p65) is increased and expressions of COX-2 and iNOS are increased in the colon; and (e) is a diagram of identifying that an intestinal microbial community in feces is changed.

As a result of performing Experimental Example 3, it was identified that bacteroidetes, actinobacteria and firmicutes in feces are decreased and γ-proteobacteria and ε-proteobacteria are increased (FIG. 6 (e)).

Example 3: Identification of a State of an Animal Model with Antibiotic Stress Induced According to Experimental Examples 2 to 5, an experiment was performed on a mouse (AP), which had been subjected to antibiotic stress with an administration of ampicillin (100 mg/kg) for consecutive two days by the same method as shown in the Experimental Example 1-(2) above.

Figure 7:
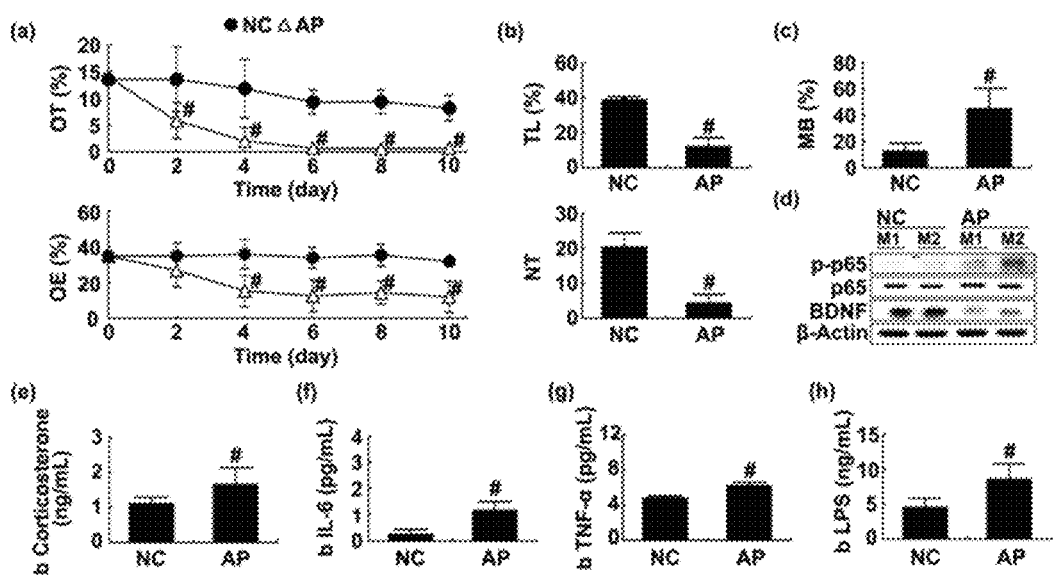
FIG. 7 shows results of measuring anxious behaviors and blood indicators with regard to a mouse (AP) subjected to antibiotic stress; (a) is a graph of identifying that time spent in open arms (OT) and open arm entries (OE) are decreased as a result of an elevated plus maze test; (b) is a graph of identifying that time in bright area is decreased as a result of a light/dark transition test; (c) is a graph of identifying that a marble-burying behavior is increased in a marble burying test; (d) is an image of identifying that an NF-κB activity (p-p65/p65) is increased in a hippocampus and an expression level of a brain derived neurotrophic factor (BDNF) is decreased; (e) is a graph of identifying that corticosterone in blood is increased; (f) is a graph of identifying that IL-6 in blood is increased; (g) is a graph identifying that TNF-α in blood is increased; and (h) is a graph of identifying that lipopolysaccharide (LPS) in blood is increased.

As a result of performing Experimental Example 2, it was identified that OT and OE are decreased in an elevated plus maze test; time in bright area is decreased in a light/dark transition test; and a marble-burying behavior is increased in a marble burying test (FIGS. 7 (a) to (c)).

It was identified that an NF-κB activity (p-p65/p65) is increased in a hippocampus; an expression level of a brain derived neurotrophic factor (BDNF) is decreased (FIG. 7 (d)); and amounts of corticosterone, IL-6, TNF-α and lipopolysaccharide in blood are increased (FIGS. 7 (e) to (h)).

Figure 8:
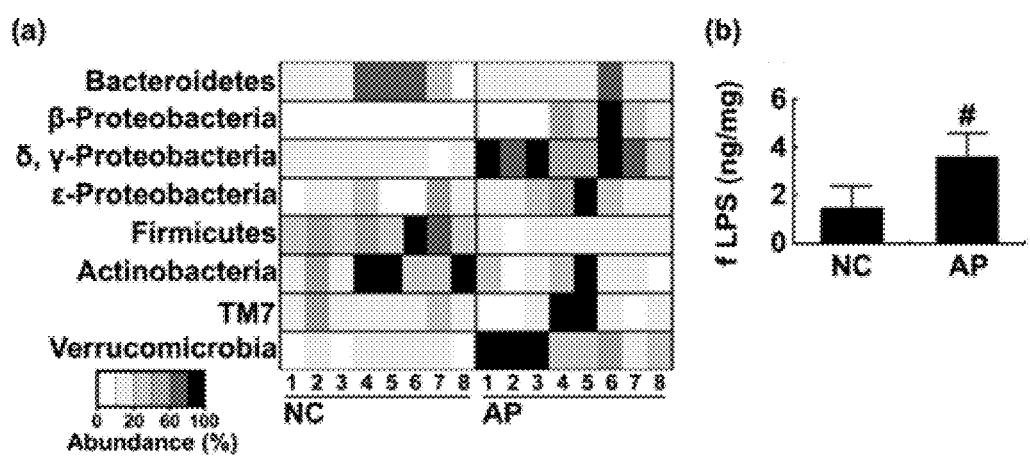
FIG. 8 (a) is a diagram of identifying that there is a change in an intestinal microbial community in feces of a mouse (AP) subjected to antibiotic stress.

As a result of performing Experimental Example 3, it was identified that bacteroidetes, actinobacteria and firmicutes in feces are decreased and δ, γ-proteobacteria and ε-proteobacteria are increased. As a result of performing Experimental Example 4, it was identified that lipopolysaccharide in feces is increased (FIGS. 8 (a) and (b)).

Figure 9:
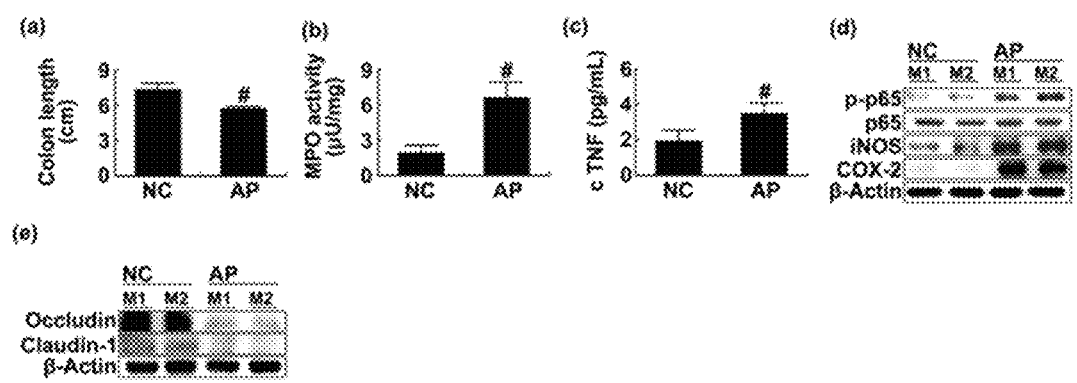
FIG. 9 shows results of measuring colitis indicators with regard to a mouse (AP) subjected to antibiotic stress; (a) is a graph of identifying that there is a decrease in a length of a colon; (b) is a graph of identifying that myeloperoxidase is increased in the colon; (c) is a graph of identifying that TNF-α is increased in the colon; (d) is an image of identifying that an NF-κB activity (p-p65/p65) is increased and expressions of COX-2 and iNOS are increased in the colon; and (e) is an image of identifying that occludin and claudin-1 are decreased in the colon.

As a result of performing Experimental Example 5, it was identified that as indicators of colitis, a length of a colon is decreased; myeloperoxidase is increased; TNF-α of the colon is increased; expressions of COX-2 and iNOS of the colon are increased; an NF-κB activity is increased; and occludin and claudin-1, tight junction proteins, are decreased (FIGS. 9 (a) to (e)).

Example 4: Identification of a State of an Animal Model Administered with Microorganisms Isolated from Feces of the Animal Model with Stress Induced (1) Isolation of Microorganisms from Feces of the Animal Model with Stress Induced Feces of a mouse subjected to immobilization stress and faces of a mouse subjected to antibiotic stress were cultured in a selective medium, respectively. As a result, it was identified that enterobacteriaceae grown in a DHL medium is increased, and in particular *Klebsiella oxytoca*, *Escherichia coli* and *Morganella morganii* are increased (FIG. 10 (A)).

Figure 10:
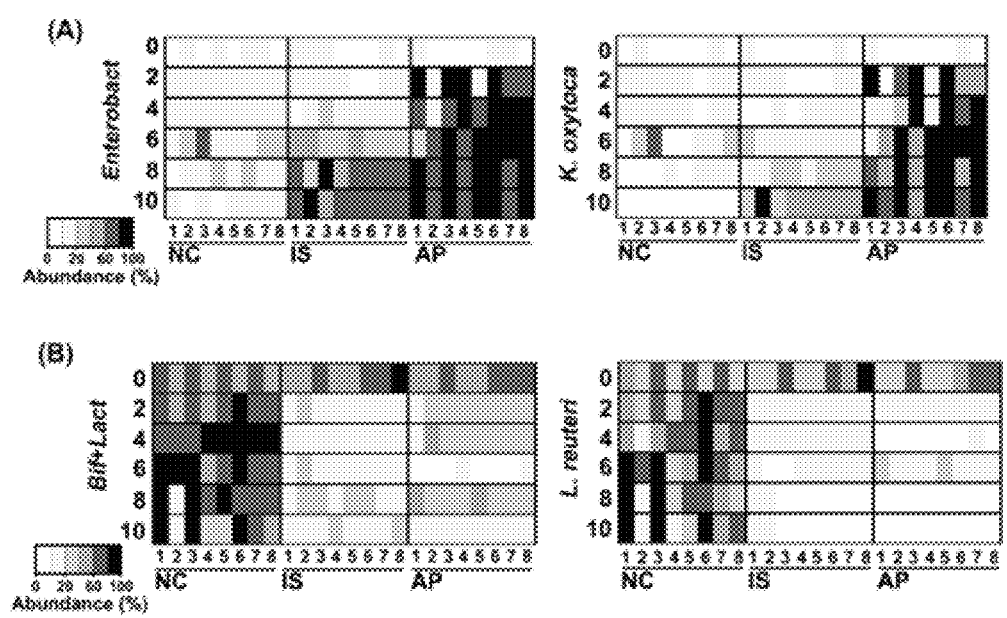
FIG. 10 (A) is a diagram of identifying which bacterium is increased as a result of culturing feces of a mouse (IS) subjected to immobilization stress and feces of a mouse (AP) subjected to antibiotic stress in a selective medium.

On the other hand, it was identified that bifidobacteria and lactobacilli grown in a BL medium are decreased, and in particular *Lactobacillus reuteri*, *Lactobacillus johnsonii*, *Lactobacillus rhamnosus* and *Bifidobacterium animalis* are decreased (FIG. 10 (B)).

(2) Identification of a State of an Animal Model Administered with Microorganisms After administering to each mouse 1×10⁹ cfu of *Klebsiella oxytoca*, *Escherichia coli* and *Morganella morganii* respectively, which had been increased in feces of the mouse subjected to immobilization stress and the mouse subjected to antibiotic stress, an elevated plus maze test was performed according to Experimental Example 2-(1) above. As a result, it was identified that OT and OE are remarkably decreased in a group administered with *Klebsiella oxytoca* compared to a group administered with other microorganisms (FIG. 11 (a)).

After that, according to Experimental Examples 2 to 5, an experiment was performed on a mouse (KO) administered with *Klebsiella oxytoca*.

Figure 11:
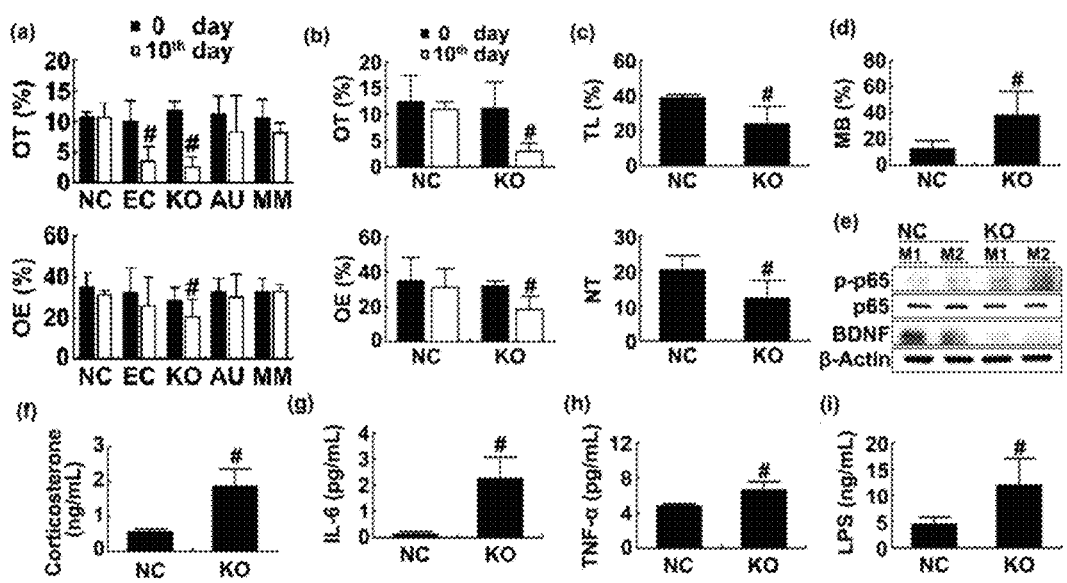
FIG. 11 shows results of measuring anxious behaviors and blood indicators with regard to a mouse (AP) administered with a microorganism increased in feces of mice subjected to immobilization stress and antibiotic stress; (a) is a graph of identifying that time spent in open arms (OT) and open arm entries (OE) are remarkably decreased in a group administered with *Klebsiella oxytoca*, as a result of an elevated plus maze test with mice administered with *Klebsiella oxytoca* (KO), *Escherichia coli* (EC), *Aerococcus urinaeequi* (AU) and *Morganella morganii* (MM); (b) is a graph of identifying that time spent in open arms (OT) and open arm entries (OE) are decreased as a result of an elevated plus maze test with a mouse administered with *Klebsiella oxytoca* (KO); (c) is a graph of identifying that time in bright area is decreased as a result of a light/dark transition test; (d) is a graph of identifying that a marble-burying behavior is increased in a marble burying test; (e) is an image of identifying that an NF-κB activity (p-p65/p65) is increased in a hippocampus and an expression level of a brain derived neurotrophic factor (BDNF) is decreased; (f) is a graph of identifying that corticosterone in blood is increased; (g) is a graph of identifying that IL-6 in blood is increased; (h) is a graph of identifying that TNF-α in blood is increased; and (i) is a graph of identifying that lipopolysaccharide (LPS) in blood is increased.

As a result of performing Experimental Example 2, it was identified that OT and OE are decreased in an elevated plus maze test; time in bright area is decreased in a light/dark transition test; and a marble-burying behavior is increased in a marble burying test (FIGS. 11 (b) to (d)).

It was identified that an NF-κB activity (p-p65/p65) is increased in a hippocampus; an expression level of a brain derived neurotrophic factor (BDNF) is decreased (FIG. 11 (e)); and amounts of corticosterone, IL-6, TNF-α and lipopolysaccharide in blood are increased (FIGS. 11 (f) to (i)).

Figure 12:
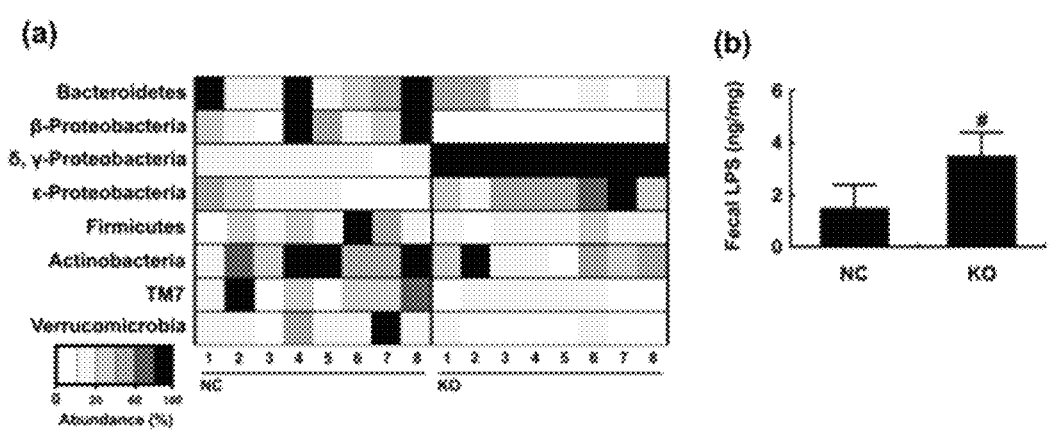
FIG. 12 (a) is a diagram of identifying that there is a change in an intestinal microbial community in feces of a mouse (KO) administered with *Klebsiella oxytoca*.

As a result of performing Experimental Example 3, it was identified that bacteroidetes, actinobacteria and firmicutes in feces are decreased and δ, γ-proteobacteria and ε-proteobacteria in feces are increased. As a result of performing Experimental Example 4, it was identified that lipopolysaccharide in feces is increased (FIGS. 12 (a) and (b)).

Figure 13:
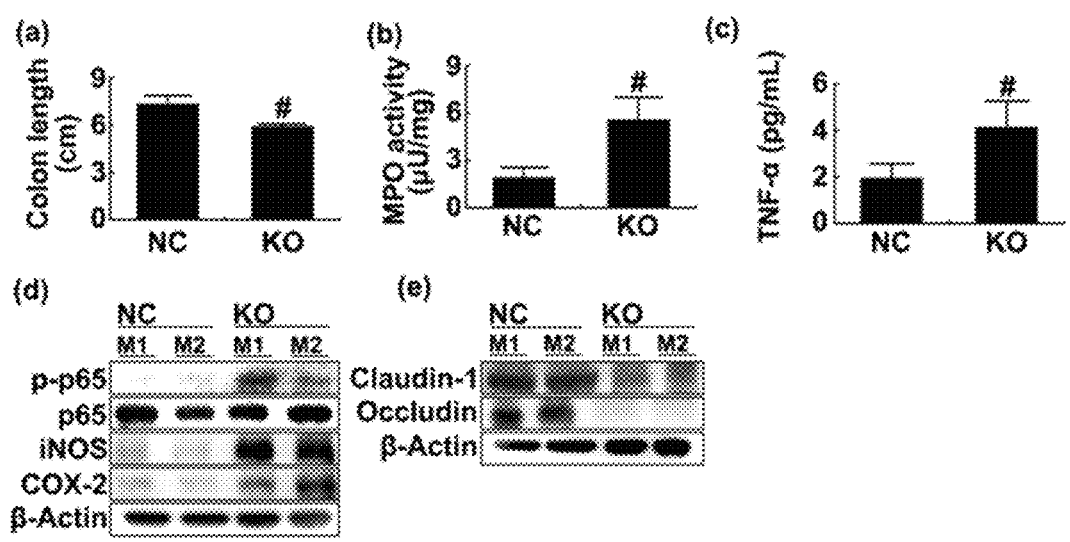
FIG. 13 shows results of measuring colitis indicators with regard to a mouse (KO) administered with *Klebsiella oxytoca*; (a) is a graph of identifying that a length of a colon is decreased; (b) is a graph of identifying that myeloperoxidase is increased in the colon; (c) is a graph of identifying that TNF-α is increased in the colon; (d) is an image of identifying that an NF-κB activity (p-p65/p65) is increased and expressions of COX-2 and iNOS are increased in the colon; and (e) is an image of identifying that occludin and claudin-1 are decreased in the colon.

As a result of performing Experimental Example 5, it was identified that as indicators of colitis, a length of a colon is decreased; myeloperoxidase is increased; TNF-α of the colon is increased; expressions of COX-2 and iNOS of the colon are increased; an NF-κB activity is increased; and occludin and claudin-1, tight junction proteins, are decreased (FIGS. 13 (a) to (e)).

Example 5: Isolation and Identification of Lactic Acid Bacteria (1) Isolation of Lactic Acid Bacteria from Human and Mouse Feces Fresh human and mouse feces were inserted and suspended in a GAM liquid medium (GAM broth; Nissui Pharmaceutical, Japan), respectively. After that, supernatant was taken and implanted to MRS, BHI (Brain-Heart-Infusion) or BL agar medium (Nissui Pharmaceutical, Japan), then anaerobically cultured at 37° C. for about 48 to 72 hours, and then strains forming a colony were isolated therefrom.

(2) Identification of Isolated Lactic Acid Bacteria

Physiological characteristics and 16S rDNA sequences of strains isolated from human or mouse feces were analyzed, then species of the strains were identified, and then names were given to the strains. Strain names given to lactic acid bacteria are as shown in a following table 2. Particularly, lactic acid bacteria isolated from human or mouse feces were 9 types of *Lactobacillus* spp. and 22 types of *Bifidobacterium* spp.

TABLE 2

| Management no. | Strain name |
|---|---|
| 1 | *Lactobacillus reuteri* NK31 |
| 2 | *Lactobacillus reuteri* NK32 |
| 3 | *Lactobacillus reuteri* NK33 |
| 4 | *Lactobacillus reuteri* NK34 |
| 5 | *Lactobacillus reuteri* NK35 |
| 6 | *Lactobacillus johnsonii* NK36 |
| 7 | *Lactobacillus johnsonii* NK37 |
| 8 | *Lactobacillus johnsonii* NK38 |
| 9 | *Lactobacillus johnsonii* NK39 |
| 10 | *Bifidobacterium longum* NK81 |
| 11 | *Bifidobacterium longum* NK82 |
| 12 | *Bifidobacterium longum* NK83 |
| 13 | *Bifidobacterium longum* NK84 |
| 14 | *Bifidobacterium bifidum* NK85 |
| 15 | *Bifidobacterium bifidum* NK86 |
| 16 | *Bifidobacterium infantis* NK87 |
| 17 | *Bifidobacterium infantis* NK88 |
| 18 | *Bifidobacterium infantis* NK89 |
| 19 | *Bifidobacterium breve* NK90 |
| 20 | *Bifidobacterium breve* NK91 |

TABLE 2-continued

| Management no. | Strain name |
|---|---|
| 21 | *Bifidobacterium choerinum* NK92 |
| 22 | *Bifidobacterium catenulatum* NK93 |
| 23 | *Bifidobacterium catenulatum* NK94 |
| 24 | *Bifidobacterium adolescentis* NK95 |
| 25 | *Bifidobacterium pseudolongum* NK96 |
| 26 | *Bifidobacterium adolescentis* NK97 |
| 27 | *Bifidobacterium adolescentis* NK98 |
| 28 | *Bifidobacterium adolescentis* NK99 |
| 29 | *Bifidobacterium pseudocatenulatum* NK100 |
| 30 | *Bifidobacterium pseudocatenulatum* NK101 |
| 31 | *Bifidobacterium minimum* NK102 |

(3) Physiological Characteristics of *Lactobacillus reuteri* NK33, a Novel Lactic Acid Bacterium Out of strains described in Table 2 above, it was identified that *Lactobacillus reuteri* NK33 (accession number KCCM12090P) is a gram-positive *bacillus*. Also, it was shown that a 16S rDNA of *Lactobacillus reuteri* NK33 has a sequence of SEQ ID NO: 1. As a result of comparing the 16S rDNA sequences of *Lactobacillus reuteri* NK33 by means of BLAST search, it was identified that a *Lactobacillus reuteri* strain having the same 16S rDNA sequence is not searched at all, and 99% homologous to the 16S rDNA sequence of a known *Lactobacillus reuteri* strain.

Out of physiological characteristics of *Lactobacillus reuteri* NK33, availability of carbon source was analyzed with a sugar fermentation test using API 50 CHL kit (BioMerieux's, USA). The results thereof are as shown in a following table 3. In Table 3 below, "+" indicates that availability of carbon source is positive and "−" indicates that availability of carbon source is negative.

TABLE 3

| Carbon source | *L. reuteri* NK33 |
|---|---|
| CONTROL | − |
| Glycerol | − |
| Erythritol | − |
| D-arabinose | − |
| L-arabinose | + |
| D-ribose | + |
| D-xylose | + |
| L-xylose | − |
| D-adonitol | − |
| Methyl-β-D-xylopyranoside | − |
| D-galactose | + |
| D-glucose | + |
| D-fructose | + |
| D-mannose | + |
| L-sorbose | − |
| Rhamnosus | − |
| Dulcitol | − |
| Inocitol | − |
| Mannitol | + |
| Sorbitol | ± |
| α-methyl-D-mannoside | − |
| α-methyl-D-glucoside | − |
| N-acetyl-glucosamine | + |
| Amygdalin | + |
| Arbutin | + |
| Esculin | + |
| Salicin | + |
| Cellobiose | + |
| Maltose | + |
| Lactose | + |
| Melibiose | + |
| Sucrose | + |
| Trehalose | + |
| Inulin | − |
| Melezitose | + |
| Raffinose | + |
| Starch | − |
| Glycogen | − |
| Xylitol | − |
| Gentiobiose | + |
| D-turanose | + |
| D-lixose | − |
| D-tagatose | − |
| D-fucose | − |
| L-fucose | − |
| D-arabitol | − |
| L-arabitol | − |
| Gluconate | ± |
| 2-keto-gluconate | − |
| 5-keto-gluconate | − |

(4) Physiological Characteristics of *Bifidobacterium adolescentis* NK98, a Novel Lactic Acid Bacterium Out of strains described in Table 2 above, it was shown that a 16S rDNA of *Bifidobacterium adolescentis* NK98 (accession number KCCM12297P) has a sequence of SEQ ID NO: 38. As a result of comparing the 16S rDNA sequences of *Bifidobacterium adolescentis* NK98 by means of BLAST search, it was identified that a *Bifidobacterium adolescentis* NK98 strain having the same 16S rDNA sequence is not searched at all, and 98% homologous to the 16S rDNA sequence of a known *Bifidobacterium adolescentis* strain.

Out of physiological characteristics of *Bifidobacterium adolescentis* NK98, availability of carbon source was analyzed with a sugar fermentation test using API kit (API 20A, BioMerieux's, USA). The results thereof are as shown in a following table 4. In Table 4 below, "+" indicates that availability of carbon source is positive and "−" indicates that availability of carbon source is negative.

TABLE 4

| Carbon source | Reaction/Enzyme | *B. adolescentis* NK98 |
|---|---|---|
| L-tryptophan | Indole formation | − |
| Urea | Urease | − |
| D-glucose | Acidification (glucose) | + |
| D-mannitol | Acidification (mannitol) | + |
| D-lactose | Acidification (lactose) | + |
| D-saccharose | Acidification (saccharose) | + |
| D-maltose | Acidification (maltose) | + |
| Salicin | Acidification (salicin) | + |
| D-xylose | Acidification (xylose) | ± |
| L-arabinose | Acidification (arabinose) | + |
| Gelatin | Hydrolysis (protease) | + |
| Esculin ferric citrate | Hydrolysis (β-glucosidase) | + |
| Glycerol | Acidification (glycerol) | − |
| D-cellobiose | Acidification (cellobiose) | ± |
| D-mannose | Acidification (mannose) | − |
| D-melezitose | Acidification (melezitose) | − |
| D-raffinose | Acidification (raffinose) | + |
| D-sorbitol | Acidification (sorbitol) | − |
| L-rhamnose | Acidification (rhamnose) | − |
| D-trehalose | Acidification (trehalose) | + |
|  | Catalase | − |
|  | Spores | − |
|  | Gram reaction | + |
|  | Morphology | − |

Example 6: Comparison of Activity of Isolated Lactic Acid Bacteria

(1) Antioxidant Activity (In Vitro)

DPPH (2,2-Diphenyl-1-picrylhydrazyl) was dissolved in ethanol to reach a 0.2 mM concentration, such that a DPPH solution was prepared. A suspension of lactic acid bacteria ($1 \times 10^8$ CFU/ml) or a vitamin C solution (1 g/ml) was inserted into 0.1 ml of the said DPPH solution, and then cultured at 37° C. for 20 minutes. A culture fluid was centrifuged at 3000 rpm for five minutes, such that supernatant was obtained. After that, an absorbance of the supernatant was measured at 517 nm, and then antioxidant activity of isolated lactic acid bacteria was calculated accordingly. Antioxidant activity of each lactic acid bacterium is as shown in following table 5 (*Lactobacillus* spp.) and table 6 (*Bifidobacterium* spp.).

(2) Measurement of Inflammatory Indicators in Macrophage 2 ml of sterilized 4% thioglycolate was intraperitoneally administered into a C57BL/6 mouse (male, 6-week old, 20-23 g). In 96 hours later, the mouse was anesthetized, and then 8 ml of RPMI 1640 medium was intraperitoneally administered to the mouse. In 5 to 10 minutes later, an RPMI medium (macrophage) was intraperitoneally extracted from the mouse, then centrifuged at 1000 g for 10 minutes, and then washed twice again with an RPMI 1640 medium. The said macrophage was spread into a 24-well plate at $0.5 \times 10^6$ cells per well, then treated with isolated *Lactobacillus* spp. lactic acid bacteria and lipopolysaccharide, an inflammatory reaction inducer for 2 or 24 hours, and then supernatant and cells were obtained. The obtained cells were inserted into an RIPA buffer (Gibco) and homogenized. An expression level of cytokines such as TNF-α was measured from a culture supernatant treated for 24 hours, and then expression levels of p65 (NF-κB), p-p65 (phosphor-NF-κB) and β-actin were measured from the cells obtained with treatment for two hours by means of an immunoblotting method. Expression levels of inflammatory indicators for each *Lactobacillus* spp. lactic acid bacterium are as shown in a following table 5.

(3) Measurement of Inflammatory Indicators in Microglia

A BV-2 microglia was spread into a 24-well plate at $0.5 \times 10^6$ cells per well, then treated with isolated *Bifidobacterium* spp. lactic acid bacteria and lipopolysaccharide, an inflammatory reaction inducer, for 2 or 24 hours, and then supernatant and cells were obtained. The obtained cells were inserted into an RIPA buffer (Gibco) and homogenized. Expression levels of p65 (NF-κB), p-p65 (phosphor-NF-κB) and β-actin were measured from the cells obtained with treatment for two hours by means of an immunoblotting method. Expression levels of inflammatory indicators for each *Bifidobacterium* spp. lactic acid bacterium are as shown in a following table 6.

(4) Effect of Brain Derived Neurotrophic Factor (BDNF) Expression and NF-κB Activation on SH-SY5Y Cells SH-SY5Y cells, which are a nerve call, were purchased from Korean Cell Line Bank, then cultured in a DMEM medium containing 10% FBS and 1% antibiotics, and then divided into a 12-well plate at $2 \times 10^6$ cells per well. After that, corticosterone was added into each well at a concentration of 300 mg/ml along with lactic acid bacteria ($1 \times 10^4$ CFU/ml), then cultured, and then expression levels of NF-κB (p65, p-p65) and brain derived neurotrophic factor (BDNF) were measured by means of an immunoblotting method. The BDNF expression levels and NF-κB activation levels for each lactic acid baterium are as shown in following table 5 (*Lactobacillus* spp.) and table 6 (*Bifidobacterium* spp.).

TABLE 5

| Strain name | Antioxidant activity | Macrophage | | | SH-SY5Y cell | |
| --- | --- | --- | --- | --- | --- | --- |
| | | TNF-α inhibitory capacity | IL-10 expression increase | NF-κB inhibitory capacity | BDNF Expression increase | NF-κB inhibition |
| *L. reuteri* NK31 | + | + | + | + | + | + |
| *L. reuteri* NK32 | ++ | ++ | ++ | ++ | + | ++ |
| *L. reuteri* NK33 | +++ | ++ | ++ | ++ | ++ | ++ |
| *L. reuteri* NK34 | + | + | + | + | + | + |
| *L. reuteri* NK35 | + | + | + | + | + | + |
| *L. johnsonii* NK36 | ++ | ++ | ++ | + | ++ | + |
| *L. johnsonii* NK37 | ++ | ++ | ++ | ++ | + | ++ |
| *L. johnsonii* NK38 | + | + | + | + | + | + |
| *L. johnsonii* NK39 | + | + | + | + | − | + |

TABLE 6

| Strain name | Antioxidant activity | Microglia NF-κB inhibitory capacity | SH-SY5Y cell BDNF expression capacity |
| --- | --- | --- | --- |
| Untreated | − | − | − |
| *L. reuteri* NK33 | +++ | ++ | ++ |
| *B. longum* NK81 | + | + | + |
| *B. longum* NK82 | + | + | + |
| *B. longum* NK83 | ++ | + | + |
| *B. longum* NK84 | ++ | ++ | + |
| *B. bifidum* NK85 | ++ | ++ | + |
| *B. bifidum* NK86 | + | − | + |
| *B. infantis* NK87 | ++ | + | + |
| *B. infantis* NK88 | + | + | ++ |
| *B. infantis* NK89 | + | + | + |
| *B. breve* NK90 | + | + | ++ |
| *B. breve* NK91 | ++ | + | + |
| *B. choerinum* NK92 | + | + | + |
| *B. catenulatum* NK93 | + | + | + |
| *B. catenulatum* NK94 | + | + | + |
| *B. adolescentis* NK95 | ++ | + | + |
| *B. pseudolongum* NK96 | ++ | + | + |
| *B. adolescentis* NK97 | + | + | + |
| *B. adolescentis* NK98 | ++ | +++ | +++ |

TABLE 6-continued

| Strain name | Antioxidant activity | Microglia NF-κB inhibitory capacity | SH-SY5Y cell BDNF expression capacity |
|---|---|---|---|
| B. adolescentis NK99 | + | ++ | ++ |
| B. pseudocatenulatum NK100 | ++ | + | ++ |
| B. pseudocatenulatum NK101 | ++ | + | + |
| B. minimum NK102 | + | + | + |

* -, <10%; +, 10~30%; ++, 30~50%; +++, >50%

(5) Experimental Results

As a result of evaluating the activity of isolated lactic acid bacteria, it was identified that out of isolated *Lactobacillus* spp. or *Bifidobacterium* spp. lactic acid bacteria, *Lactobacillus reuteri* NK33 and *Bifidobacterium adolescentis* NK98 herein have a remarkably excellent effect on promoting antioxidant activity and inhibiting inflammatory reactions. In particular, it was identified that *Lactobacillus reuteri* NK33 and *Bifidobacterium adolescentis* NK98 inhibit the activity of NF-κB, known as a substance of inducing aging-related diseases such as Alzheimer's disease, inhibit an inflammatory reaction of microglia present in aging, dementia and the like, and increase an expression of a brain derived neurotrophic factor (BDNF) which is produced by a brain nerve, but decreased in aging, dementia and the like (Tables 5 and 6).

Example 7: Evaluation of an Immunoregulatory Effect of Isolated *Bifidobacterium* Spp. Lactic Acid Bacteria To evaluate an immunoregulatory effect of *Bifidobacterium* spp. lactic acid bacteria isolated from feces, the effect of *Bifidobacterium* spp. lactic acid bacteria on an immuno reaction of macrophage and spleen cells was measured.

(1) Immuno Reaction in Macrophage 2 ml of sterilized 4% thioglycolate was intraperitoneally administered into a C57BL/6 mouse (male, 6-week old, 20-23 g, Raonbio Co., Ltd.). In 96 hours after administration, the mouse was anesthetized, and then 8 ml of RPMI 1640 medium was intraperitoneally administered to the mouse. In 5 to 10 minutes later, an RPMI medium (including macrophage) was intraperitoneally extracted from the mouse, then centrifuged at 1000 rpm for 10 minutes, and then washed twice again with an RPMI 1640 medium. The said macrophage was spread over a 24-well plate at $0.5 \times 10^6$ cells per well, then cultured for 24 hours, and then unattached cells were removed and used.

The said macrophage culture fluid was treated with *Bifidobacterium adolescentis* NK98 and lipopolysaccharide, an inflammatory reaction inducer, for 2 or 24 hours, and then supernatant and cells were obtained, wherein a concentration for treating lactic acid bacteria was $1 \times 10^4$ CFU/ml. The obtained cells were inserted into an RIPA buffer (Gibco) and homogenized. An expression level of TNF-α from the obtained supernatant was measured by means of ELISA kit, and then expression levels of p65 (NF-κB), p-p65 (phosphor-NF-κB) and β-actin from the obtained cells were measured by means of an immunoblotting method. Particularly, 50 μg of the supernatant was taken and subjected to electrophoresis in SDS 10% (w/v) polyacrylamide gel for one and half an hour. A sample subjected to electrophoresis was transferred onto a nitrocellulose paper on condition of 100 V and 400 mA for one hour and 10 minutes. The nitrocellulose paper, onto which the sample was transferred, was subjected to blocking by means of 5% skimmed milk for 30 minutes, then washed with PBS-Tween three times each for five minutes, and then subjected to reaction overnight with primary antibodies (Santa Cruz Biotechnology, the U.S.) at a ratio of 1:100. After that, such paper was washed three times each for 10 minutes, and subjected to reaction with secondary antibodies (Santa Cruz Biotechnology, the U.S.) at a ratio of 1:1000 for one hour and 20 minutes. Then, such paper was washed three times each for 15 minutes, then subjected to fluorescence and luminescence, then developed, and then intensity of a chromophore band was measured, wherein the results thereof are as shown in a following table 7.

TABLE 7

| Strain name | NF-κB inhibitory capacity (p-p65/p65) | TNF-α inhibitory capacity |
|---|---|---|
| Untreated | - | - |
| B. adolescentis NK98 | + | ++ |

* Inhibition rate: -, <10%; +, 10~30%; ++, 30~60%; +++, >60

(2) Immuno Reaction in Spleen Cells

A spleen of a C57BL/6 mouse (male, 6-week old, 20-22 g, OrientBio Co., Ltd.) was isolated and crushed, and then suspended in an RPMI 1640 medium containing 10% FCS. CD4 T cells were isolated therefrom by means of CD4 T cell isolation kit (MiltenyiBiotec, Bergisch Gladbach, Germany), and then the isolated CD4 T cells were divided into a 12-well plate at $5 \times 10^5$ cells per well.

The cells were cultured with an addition of anti-CD3, anti-CD28, IL-2 and IL-12 to induce differentiation of T cells into Th1 cells; anti-CD3, anti-CD28, IL-2 and IL-4 to induce differentiation of T cells into Th2 cells; anti-CD3, anti-CD28, IL-6 and TGF-β to induce differentiation of T cells into Th17 cells; and anti-CD3 and anti-CD28 to induce differentiation of T cells into Treg cells, then lactic acid bacteria were inserted thereinto at $1 \times 10^5$ CFU/ml per well, and then cultured for four days.

After that, a differentiation potency of T cells isolated from the spleen into Th1 cells, Th2 cells, Th17 cells and Treg cells was measured. Particularly, cells of culture fluid were stained with anti-FoxP3 or anti-IL-17A antibodies, and then a distribution of Th1 cells, Th2 cells, Th17 cells and Treg cells was analyzed by means of FACS (fluorescence-activated cell sorting) device (C6 Flow Cytometer System, San Jose, CA, USA), wherein the results thereof are as shown in a following table 8.

TABLE 8

| Strain name | Differentiation inhibition rate | | | Differentiation increase rate |
|---|---|---|---|---|
| | Th1 cell | Th2 cell | Th17 cell | Treg cell |
| Untreated | - | - | - | - |
| B. longum NK81 | + | ++ | + | + |
| B. longum NK82 | + | ++ | + | + |
| B. longum NK83 | + | ++ | ++ | + |

TABLE 8-continued

| Strain name | Differentiation inhibition rate | | | Differentiation increase rate |
|---|---|---|---|---|
| | Th1 cell | Th2 cell | Th17 cell | Treg cell |
| B. longum NK84 | +++ | + | +++ | ++ |
| B. bifidum NK85 | +++ | + | +++ | ++ |
| B. bifidum NK86 | + | + | +++ | + |
| B. infantis NK87 | + | + | +++ | ++ |
| B. infantis NK88 | + | + | +++ | + |
| B. infantis NK89 | + | + | +++ | + |
| B. breve NK90 | + | +++ | ++ | ++ |
| B. breve NK91 | ++ | ++ | + | + |
| B. choerinum NK92 | − | + | + | − |
| B. catenulatum NK93 | + | ++ | ++ | + |
| B. catenulatum NK94 | ++ | + | + | ++ |
| B. adolescentis NK95 | ++ | + | + | + |
| B. pseudolongum NK96 | ++ | ++ | ++ | + |
| B. adolescentis NK97 | + | ++ | + | + |
| B. adolescentis NK98 | ++ | ++ | +++ | +++ |
| B. adolescentis NK99 | + | + | ++ | + |
| B. pseudocatenulatum NK100 | ++ | ++ | + | + |
| B. pseudocatenulatum NK101 | + | ++ | + | + |
| B. minimum NK102 | + | + | + | + |

* Inhibition rate: −, <10%; +, 10-30%; ++, 30-60%; +++, >60
* Increase rate: −, <10%; +, 10-50%; ++, 50-100%; +++, >100%

Also, expression rates of transcription factors and cytokines of Th1 cells, Th2 cells, Th17 cells and Treg cells isolated from the spleen T cells were measured. Particularly, the expression levels of T-bet, IFN-γ and IL-12 from a Th1 cell differentiation-inducing culture fluid; GATA3 and IL-5 from a Th2 cell differentiation-inducing culture fluid; RORγt and IL-17 from a Th17 cell differentiation-inducing culture fluid; and Foxp3 and IL-10 from a Treg cell differentiation-inducing culture fluid were analyzed by means of qRT-PCR, wherein the results thereof are as shown in a following table 9.

TABLE 9

| Strain name | Expression inhibition rate | | | | | | Expression increase rate | |
|---|---|---|---|---|---|---|---|---|
| | T-bet | IFN-γ | GATA3 | IL-5 cell | RORγt | IL-17 | FOXp3 | IL-10 |
| Untreated | − | − | − | − | − | − | − | − |
| B. longum NK81 | ++ | + | + | + | + | + | − | + |
| B. longum NK82 | + | + | + | + | + | + | + | + |
| B. longum NK83 | + | + | + | + | + | + | + | + |
| B. longum NK84 | ++ | ++ | + | + | +++ | +++ | ++ | ++ |
| B. bifidum NK85 | +++ | +++ | + | + | + | + | ++ | ++ |
| B. bifidum NK86 | − | − | + | + | + | + | + | + |
| B. infantis NK87 | + | + | + | + | + | + | + | + |
| B. infantis NK88 | + | + | ++ | ++ | + | + | + | + |
| B. infantis NK89 | + | + | + | + | ++ | ++ | + | + |
| B. breve NK90 | + | + | +++ | +++ | ++ | ++ | ++ | ++ |
| B. breve NK91 | + | + | + | + | + | +++ | ++ | + |
| B. choerinum NK92 | + | + | + | + | + | ++ | + | ++ |
| B. catenulatum NK93 | + | + | + | + | + | + | + | + |
| B. catenulatum NK94 | ++ | + | + | + | + | + | + | + |
| B. adolescentis NK95 | + | + | + | + | ++ | ++ | ++ | ++ |
| B. pseudolongum NK96 | + | + | + | + | + | + | + | + |
| B. adolescentis NK97 | + | + | + | + | + | + | + | + |
| B. adolescentis NK98 | ++ | ++ | ++ | ++ | +++ | +++ | +++ | +++ |
| B. adolescentis NK99 | + | ++ | + | + | + | + | + | + |
| B. pseudocatenulatum NK100 | ++ | + | + | + | − | − | + | + |
| B. pseudocatenulatum NK101 | ++ | + | + | + | − | − | + | + |
| B. minimum NK102 | + | + | + | + | + | − | − | − |

* Inhibition rate: −, <10%; +, 10-30%; ++, 30-60%; +++, >60
* Increase rate: −, <10%; +, 10-50%; ++, 50-100%; +++, >100%

As identified in Tables 8 and 9 above, it was identified that *Bifidobacterium adolescentis* NK98 has a high inhibition rate on the differentiation of T cells into Th1 cells, Th2 cells and Th17 cells and in particular has a high increase rate on the differentiation of T cells into Treg cells, thus effectively inhibiting an inflammatory reaction, and effectively improving an inflammatory disease accordingly.

Example 8: Effect of *Lactobacillus reuteri* NK33 on Reducing Stress

From Day 7 after starting a immobilization stress process with regard to a mouse, which had been subjected to immobilization stress as shown in Experimental Example 1 above, $1\times10^9$ cfu of *Lactobacillus reuteri* NK33, a novel lactic acid bacterium, or physiological saline solution was administered once daily for five days to the mouse. According to Experimental Examples 2 to 5, an experiment was performed on the mouse above.

Figure 14:
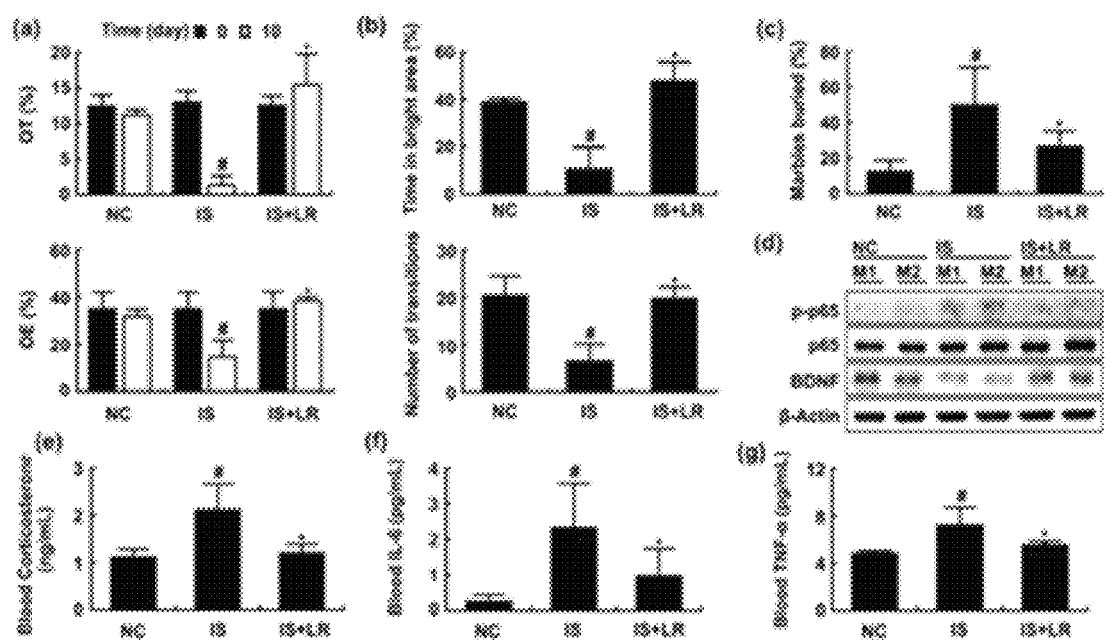
FIG. 14 shows results of measuring anxious behaviors with regard to and comparing blood indicators between a group (IS), in which a mouse subjected to immobilization stress is administered with physiological saline solution, and a group administered with *Lactobacillus reuteri* NK33 (IS+LR), a novel lactic acid bacterium; (a) is a graph of identifying that time spent in open arms (OT) and open arm entries (OE) are increased as a result of an elevated plus maze test with the group administered with *Lactobacillus reuteri* NK33 (IS+LR), the novel lactic acid bacterium; (b) is a graph of identifying that time in bright area is increased as a result of a light/dark transition test; (c) is a graph of identifying that a marble-burying behavior is decreased in a marble burying test; (d) is an image of identifying that an NF-κB activity (p-p65/p65) is inhibited in a hippocampus and an expression level of a brain derived neurotrophic factor (BDNF) is increased; (e) is a graph of identifying that corticosterone in blood is decreased; (f) is a graph of identifying that IL-6 in blood is decreased; and (g) is a graph of identifying that TNF-α in blood is decreased.

As a result of performing Experimental Example 2, it was identified in a group (IS) administered with physiological saline solution that OT and OE are decreased in an elevated plus maze test; time in bright area is decreased in a light/dark transition test; and a marble-burying behavior is increased in a marble burying test. However, it was identified in a group (IS+LR) administered with *Lactobacillus reuteri* NK33 that OT and OE are increased; time in bright area is increased; and a marble-burying behavior is decreased in a marble burying test (FIGS. 14 (*a*) to (*c*)).

It was identified in the group (IS) administered with physiological saline solution that an NF-κB activity (p-p65/p65) is increased in a hippocampus; an expression level of a brain derived neurotrophic factor (BDNF) is decreased; and amounts of corticosterone, IL-6, TNF-α and lipopolysaccharide in blood are increased. However, it was identified in the group (IS+LR) administered with *Lactobacillus reu-* teri NK33 that an NF-κB activity (p-p65/p65) is inhibited; an expression level of a brain derived neurotrophic factor (BDNF) is increased; and amounts of corticosterone, IL-6, TNF-α and lipopolysaccharide in blood are decreased (FIGS. 14 (d) to (g)).

Figure 15:
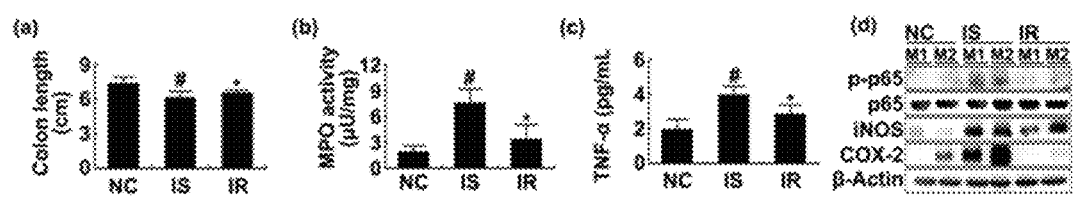
FIG. 15 shows results of measuring colitis indicators with regard to a group (IS), in which a mouse subjected to immobilization stress is administered with physiological saline solution, and a group administered with *Lactobacillus reuteri* NK33 (IS+LR), a novel lactic acid bacterium; (a) is a graph of identifying that a length of a colon is recovered; (b) is a graph of identifying that myeloperoxidase is decreased in the colon; (c) is a graph of identifying that TNF-α is decreased in the colon; and (d) is an image of identifying that an NF-κB activity (p-p65/p65) is decreased and expressions of COX-2 and iNOS are decreased in the colon.

As a result of performing Experimental Example 5, it was identified in the group (IS) administered with physiological saline solution that as indicators of colitis, a length of a colon is decreased; myeloperoxidase is increased; TNF-α of the colon is increased; expressions of COX-2 and iNOS of the colon are increased; and an NF-κB activity is increased. However, it was identified in the group (IR) administered with *Lactobacillus reuteri* NK33 that a length of a colon is recovered to a normal level; myeloperoxidase is decreased; TNF-α of the colon is decreased; expressions of COX-2 and iNOS of the colon are decreased; and an NF-κB activity is inhibited (FIGS. 15 (a) to (d)).

From the results, it was identified that *Lactobacillus reuteri* NK33, the novel lactic acid bacterium, has an excellent effect of improving a mental disorder, such as anxiety, depression, stress and the like.

Example 9: Effect of *Bifidobacterium adolescentis* NK98 on Reducing Stress

From Day 7 after starting the immobilization stress process with regard to the mouse, which had been subjected to immobilization stress as shown in Experimental Example 1 above, $1\times10^9$ cfu of *Bifidobacterium adolescentis* NK98 (NK98), $1\times10^9$ cfu of *Bifidobacterium adolescentis* IM38 (IM38), physiological saline solution (IS) or 1 mg/kg of Buspirone was administered once daily for three days to a mouse. Then, according to Experimental Examples 2 and 5 above, an experiment was performed.

(1) Elevated Plus Maze Test

Along with an elevated plus maze test of Experimental Example 2-(1) above, an amount of corticosterone (BC) in blood was measured, wherein the results thereof are as shown in a following table 10.

TABLE 10

| | Anxious mouse | | | Depressive mouse | | |
|---|---|---|---|---|---|---|
| | OT (%) | OE (%) | BC (ng/mL) | OT (%) | OE (%) | BC (ng/mL) |
| Normal control | 17.1 | 35.2 | 0.8 | 18.2 | 38.5 | 0.7 |
| IS | 5.2 | 16.1 | 2.8 | 3.4 | 13.5 | 7.4 |
| NK98 | 16.2 | 34.1 | 1.2 | 16.2 | 32.3 | 3.5 |
| IM38 | 14.3 | 32.6 | 1.5 | 13.3 | 28.6 | 4.1 |
| Buspirone | 16.7 | 33.8 | 1.2 | 15.7 | 29.8 | 3.8 |

As identified in Table 10 above, it was identified in the group (IS) of immobilization stress models administered with physiological saline solution that both OT and OE are decreased in an elevated plus maze test compared to a normal control group without immobilization stress. However, it was identified in a group administered with *Bifidobacterium adolescentis* NK98 that time spent in open arms (OT) and frequency of open arm entries (OE) are increased; and an amount of corticosterone in blood is remarkably decreased, thus showing a more excellent effect compared to *Bifidobacterium adolescentis* IM38.

(2) Light/Dark Transition Test

According to Experimental Example 2-(2) above, a light/dark transition test was performed, wherein the results thereof are as shown in a following table 11.

TABLE 11

| | Time in bright area (%) | Number of transitions |
|---|---|---|
| Normal control | 46.5 | 23.5 |
| IS | 23.1 | 13.8 |
| NK98 | 39.4 | 21.9 |
| IM38 | 35.8 | 18.3 |
| Buspirone | 40.1 | 19.6 |

As identified in Table 11 above, it was identified in a group (IS) of immobilization stress models administered with physiological saline solution that time in bright area is decreased compared to a normal control group without immobilization stress, but in a group administered with *Bifidobacterium adolescentis* NK98 that time in bright area is increased compared to a group administered with *Bifidobacterium adolescentis* IM38.

(3) Forced Swimming Test

According to Experimental Example 2-(4) above, a forced swimming test was performed, wherein the results thereof are as shown in a following table 12.

TABLE 12

| | Immobility time (%) |
|---|---|
| Normal control | 28.5 |
| IS | 46.7 |
| NK98 | 31.2 |
| IM38 | 38.2 |
| Buspirone | 32.1 |

As identified in Table 12 above, it was identified in a group (IS) of depressed mouse models administered with physiological saline solution that an immobility time is increased compared to a normal control group without immobilization stress, and in a group administered with *Bifidobacterium adolescentis* NK98 that the immobility time is decreased compared to a group administered with *Bifidobacterium adolescentis* IM38.

(4) Tail Suspension Test (TST)

According to Experimental Example 2-(5) above, a tail suspension test (TST) was performed, wherein the results thereof are as shown in a following table 13.

TABLE 13

| | Immobility time (%) |
|---|---|
| Normal control | 21.5 |
| IS | 37.9 |
| NK98 | 24.2 |
| IM38 | 26.9 |
| Buspirone | 25.2 |

As identified in Table 13 above, it was identified in a group (IS) of depressed mouse models administered with physiological saline solution that an immobility time is increased compared to a normal control group without immobilization stress, but in a group administered with *Bifidobacterium adolescentis* NK98 that the immobility time is decreased.

(5) Measurement of Biomarkers

In two hours after performing a last behavioral experiment on a depressed mouse, the mouse was anesthetized, and corticosterone in blood was measured by means of ELISA, and a brain derived neurotrophic factor (BDNF) and NF-κB of a brain and NF-κB of a colon were measured by means of immunoblotting by the same method as shown in Experimental Example 5 above, wherein the results thereof are as shown in a following table 14.

TABLE 14

|  | NF-kB activation inhibitory capacity | BDNF expression level | Blood corticosterone (ng/mL) |
|---|---|---|---|
| Normal control |  |  | 0.7 |
| IS | − | − | 7.4 |
| NK98 | +++ | +++ | 3.5 |
| IM38 | ++ | ++ | 4.1 |
| Buspirone | − | − | 3.8 |

* −, <10%; +, 10~30%; ++, 30~50%; +++, >50%

As identified in Table 14 above, it was identified in a group (IS) administered with physiological saline solution that an NF-κB activity (p-p65/p65) is increased in a hippocampus; an expression level of a brain derived neurotrophic factor (BDNF) is decreased; and an amount of corticosterone in blood is increased. However, it was identified in a group administered with NK98 that an NF-κB activity is inhibited; an expression level of the BDNF is increased; and an amount of corticosterone in blood is decreased, wherein such effect is excellent compared to a group administered with IM38.

(6) Effect of Improving Colitis

In two hours after performing a last behavioral experiment on an anxious mouse in Experimental Example 1, the mouse was anesthetized, and a colon length and activations of MPO, COX-2, TNF-α and NF-Kb were measured by the same method as shown in Experimental Example 5, wherein the results thereof are as shown in a following table 15.

TABLE 15

|  | Colon length | MPO inhibitory | Inflammatory indicator inhibition rate | | |
|---|---|---|---|---|---|
|  | (cm) | capacity | NF-κB | COX-2 | TNF-α |
| Normal control | 6.2 |  |  |  |  |
| IS | 5.1 | − | − | − | − |
| NK98 | 5.7 | +++ | +++ | +++ | +++ |
| IM38 | 5.5 | +++ | ++ | ++ | ++ |
| Buspirone | 5.2 | + | + | + | + |

* −, <10%; +, 10~30%; ++, 30~50%; +++, >50%

As identified in Table 15 above, it was identified in a group (IS) of immobilization stress models administered with physiological saline solution that a colon length is decreased and MPO and inflammatory indicators are increased compared to a normal control group without immobilization stress, but in a group administered with *Bifidobacterium adolescentis* NK98 that a colon length is recovered, and the MPO inhibitory capacity and inflammatory indicators are improved.

(7) Effect of Reducing Antibiotics-Induced Stress

According to Experimental Examples 2 to 5, an experiment was performed on a mouse, which had been subjected to antibiotic stress with an administration of ampicillin (100 mg/kg) for consecutive two days by the same method as shown in Experimental Example 1-(2) above, wherein the results thereof are as shown in following Tables 16 and 17.

TABLE 16

|  | Time spent in open arms (%) | Open arm entries (%) | Blood corticosterone (ng/ml) |
|---|---|---|---|
| Normal control | 16.8 | 33.5 | 0.8 |
| IS | 4.9 | 13.4 | 3.2 |
| NK98 | 14.3 | 30.5 | 1.6 |
| IM38 | 12.9 | 29.2 | 1.9 |
| Buspirone | 14.1 | 31.3 | 1.6 |

TABLE 17

|  | Colon length | MPO inhibitory | Inflammatory indicator inhibition rate | | |
|---|---|---|---|---|---|
|  | (cm) | capacity | NF-κB | COX-2 | TNF-α |
| Normal control | 6.3 |  |  |  |  |
| IS | 5.4 | − | − | − | − |
| NK98 | 6.1 | +++ | +++ | +++ | +++ |
| IM38 | 5.8 | ++ | ++ | ++ | ++ |
| Buspirone | 5.5 | + | + | + | + |

* −, <10%; +, 10~30%; ++, 30~50%; +++, >50%

As identified in Table 16 above, it was identified in a group (IS) of antibiotics-induced stress models administered with physiological saline solution that OT and OE are decreased compared to a normal control group in an elevated plus maze test, and in a group administered with *Bifidobacterium adolescentis* NK98 that OT and frequency of OE are increased and an amount of corticosterone in blood is remarkably decreased, wherein such effect is excellent compared to *Bifidobacterium adolescentis* IM38.

As identified in Table 17 above, it was identified in a group (IS) of antibiotics-induced stress models administered with physiological saline solution that a colon length is decreased compared to a normal control group, and MPO and inflammatory indicators are increased, but in a group administered with *Bifidobacterium adolescentis* NK98 that a colon length is recovered and MPO inhibitory capacity and inflammatory indicators are improved.

Example 10: Effect of *Bifidobacterium adolescentis* NK98 on Improving a Cognitive Function On a following day after intraperitoneally administering LPS isolated from *E. coli* (0.5 mg/kg/day) to a mouse for five days, lactic acid bacteria were administered thereto, and an effect of lactic acid bacteria on improving a cognitive function was identified in such a way that an object recognition test and a Y maze test were performed and BDNF in a hippocampus was measured by immunoblotting, wherein the results thereof are as shown in a following table 18.

Particularly, as an object recognition test method, two objects (A, A') of the same shape and size were fixed into a box (40×40×40 cm), of which outside is not visible from the inside, then a mouse was allowed to start moving at the center of the box, and then the number of touching the two objects was recorded for 10 minutes. In 24 hours later, one of the two objects was replaced with a new one (A, B), and then the number of touching an old one and a new one was recorded and quantified.

Also, as a Y maze test method, a test apparatus consisted of the three identical arms (8 cm in length, 30 cm in width, 14 cm in height), each positioning at a certain angle of 120°. The mouse was placed at the end of one arm and allowed to freely move in a Y maze for eight minutes, after which the number and order of entering respective arms were measured, so as to evaluate a spontaneous alteration (%). The alteration was defined as an alphabetical character order, in which the mouse sequentially entered into three arms, i.e. ABC, BCA, CAB, etc.

% alteration=[Total number of alterations]/[Total number of arm entries−2]×100

TABLE 18

|  | Object recognition test (%) | Y maze test (%) | Hippocampus BDNF expression capacity |
|---|---|---|---|
| Normal control | 52.1 | 76.5 |  |
| IS | 38.5 | 56.7 | − |
| NK98 | 48.6 | 68.4 | +++ |
| IM38 | 46.5 | 64.5 | ++ |
| Buspirone | 42.9 | 62.4 | + |

* −, <10%; +, 10~30%; ++, 30~50%; +++, >50%

As identified in Table 18 above, it was identified in a group administered with *Bifidobacterium adolescentis* NK98 that a cognitive function is improved and an expression of BDNF is increased through the object recognition test and the Y maze test.

Example 11: Effect of Reducing Stress According to a Co-Administration of Two Types of Lactic Acid Bacteria

*Lactobacillus reuteri* NK33, a novel lactic acid bacterium, *Bifidobacterium adolescentis* IM38 (accession number: KCCM11807P), a bacterium disclosed in Korean patent publication No. 10-2017-0090359, or a mixture thereof were compared to each other in terms of an effect of reducing stress.

Particularly, physiological salt solution (IS), 1×10$^9$ cfu of *Lactobacillus reuteri* NK33 (NK33), 1×10$^9$ cfu of *Bifidobacterium adolescentis* IM38 (IM38) or a combination of the said lactic acid bacteria (NK33+IM38) each 0.5×10$^9$ cfu was administered into a model with immobilization stress induced as shown in Experimental Example 1-(1) above, and then an elevated plus maze test was performed. After that, blood was collected from each group, and then an amount of corticosterone in blood was measured, wherein the results thereof are as shown in a following table 19.

TABLE 19

|  | Time spent in open arms (%) | Open arm entries (%) | Blood corticosterone (ng/mL) |
|---|---|---|---|
| Normal control | 16.1 | 34.0 | 0.9 |
| IS | 5.4 | 16.1 | 2.4 |
| NK33 | 14.1 | 33.5 | 1.4 |
| IM38 | 14.8 | 31.5 | 1.5 |
| NK33 + IM38 | 17.3 | 36.5 | 1.2 |

As identified in Table 19 above, it was identified in a co-administration group that time spent in open arms and open arm entries are increased and an amount of corticosterone in blood is remarkably decreased compared to a group administered with lactic acid bacteria alone.

Also, an effect of a mixture of *Lactobacillus reuteri* NK33 and *Bifidobacterium adolescentis* NK98 on reducing stress was compared by the same method as shown in an experiment on a co-administration of NK33 and IM38 above, wherein the results thereof are as shown in a following table 20.

TABLE 20

|  | Time spent in open arms (%) | Open arm entries (%) | Blood corticosterone (ng/mL) |
|---|---|---|---|
| Normal control | 18.1 | 34.2 | 0.9 |
| IS | 5.5 | 17.1 | 2.9 |
| NK33 | 14.1 | 33.5 | 1.4 |
| NK98 | 16.8 | 33.3 | 1.3 |
| NK33 + NK98 | 18.5 | 38.2 | 1.1 |

As identified in Table 20 above, it was identified in the co-administration group that time spent in open arms and open arm entries are increased and an amount of corticosterone in blood is remarkably decreased compared to a group administered with lactic acid bacteria alone.

<Accession Information of Lactic Acid Bacteria>

The present inventors deposited *Lactobacillus reuteri* NK33 for the purpose of patent to the Korean Culture Center of Microorganisms, a certified depository institution (address: Yulim Building, 45, Hongjenae 2ga-gil, Seodaemun-gu, Seoul, South Korea) on Aug. 4, 2017, and received an accession number of KCCM12090P.

Also, the present inventors deposited *Bifidobacterium adolescentis* NK98 for the purpose of patent to the Korean Culture Center of Microorganisms, a certified depository institution (address: Yulim Building, 45, Hongjenae 2ga-gil, Seodaemun-gu, Seoul, South Korea) on Aug. 3, 2018, and received an accession number of KCCM12297P.

The invention claimed is:

1. A method for treating a mental disorder or an inflammatory disease, comprising: administering a pharmaceutical composition comprising *Lactobacillus reuteri* NK33 (KCCM12090P) into a subject, wherein the inflammatory disease is colitis, and
wherein the mental disorder is one or more selected from the group consist of anxiety, depression, and stress.

2. The method according to claim 1, wherein the *Lactobacillus reuteri* NK33 (KCCM12090P) is a live bacterial cell thereof, a dead bacterial cell thereof, a culture product thereof or a crushed product thereof.

3. The method according to claim 1, wherein the pharmaceutical composition further comprising *Bifidobacterium adolescentis* NK98 (KCCM12297P).

4. The method according to claim 3, wherein the *Bifidobacterium adolescentis* NK98 (KCCM12297P) is a live bacterial cell thereof, a dead bacterial cell thereof, a culture product thereof or a crushed product thereof.

5. A method for alleviating a mental disorder or an inflammatory disease, comprising: administering a health functional food comprising *Lactobacillus reuteri* NK33 (KCCM12090P) into a subject,
  wherein the inflammatory disease is colitis, and
  wherein the mental disorder is one or more selected from the group consist of anxiety, depression, and stress.

6. The method according to claim 5, wherein the *Lactobacillus reuteri* NK33 (KCCM12090P) is a live bacterial cell thereof, a dead bacterial cell thereof, a culture product thereof or a crushed product thereof.

7. The method according to claim 5, wherein the health functional food further comprising *Bifidobacterium adolescentis* NK98 (KCCM12297P).

8. The method according to claim 7, wherein the *Bifidobacterium adolescentis* NK98 (KCCM12297P) is a live bacterial cell thereof, a dead bacterial cell thereof, a culture product thereof or a crushed product thereof.

* * * * *

SEQUENCE LISTING

<160> NUMBER OF SEQ ID NOS: 38

<210> SEQ ID NO 1
<211> LENGTH: 1490
<212> TYPE: DNA
<213> ORGANISM: Artificial Sequence

```
<220> FEATURE:
<223> OTHER INFORMATION: NK33 16S rDNA

<400> SEQUENCE: 1
tatggctcag gatgaacgcc ggcggtgtgc ctaatacatg caagtcgtac gcactggccc      60
aactgattga tggtgcttgc acctgattga cgatggatca ccagtgagtg gcggacgggt     120
gagtaacacg taggtaacct gccccggagc gggggataac atttggaaac agatgctaat     180
accgcataac aacaaaagcc acatggcttt tgtttgaaag atggctttgg ctatcactct     240
gggatggacc tgcggtgcat tagctagttg gtaaggtaac ggcttaccaa ggcgatgatg     300
catagccgag ttgagagact gatcggccac aatggaactg agacacgtc catactccta      360 cgggaggcag cagtagggaa tcttccacaa tgggcgcaag cctgatggag caacaccgcg     420
tgagtgaaga agggtttcgg ctcgtaaagc tctgttgttg gagaagaacg tgcgtgagag     480
taactgttca cgcagtgacg gtatccaacc agaaagtcac ggctaactac gtgccagcag     540
ccgcggtaat acgtaggtgg caagcgttat ccggatttat tgggcgtaaa gcagcgcag     600 gcggttgctt aggtctgatg tgaaagcctt cggcttaacc gaagaagtgc atcggaaacc     660
gggcgacttg agtgcagaag aggacagtgg aactccatgt gtagcggtgg aatgcgtaga     720
tatatggaag aacaccagtg gcgaaggcgg ctgtctggtc tgcaactgac gctgaggctc     780
gaaagcatgg gtagcgaaca ggattagata ccctggtagt ccatgccgta acgatgagt      840 gctaggtgtt ggagggtttc cgcccttcag tgccggagct aacgcattaa gcactccgcc     900
tggggagtac gaccgcaagg ttgaaactca aaggaattga cggggcccg cacaagcggt      960 ggagcatgtg gtttaattcg aagctacgcg aagaaccta ccaggtcttg acatcttgcg     1020
ctaaccttag ataaggcg ttcccttcgg ggacgcaatg acaggtggtg catggtcgtc      1080
gtcagctcgt gtcgtgagat gttgggttaa gtcccgcaac gagcgcaacc cttgttacta    1140
gttgccagca ttaagttggg cactctagtg agactgccgg tgacaaaccg gaggaaggtg    1200
gggacgacgt cagatcatca tgccccttat gacctgggct acacacgtgc tacaatggac    1260
ggtacaacga gtcgcaagct cgcgagagta agctaatctc ttaaagccgt tctcagttcg    1320
gactgtaggc tgcaactcgc ctacacgaag tcggaatcgc tagtaatcgc ggatcagcat    1380
gccgcggtga atacgttccc gggccttgta cacaccgccc gtcacaccat ggggagtttg    1440
taacgcccaa agtcggtggc ctaacctta tggagggagc cgcctaaggc                1490

<210> SEQ ID NO 2
<211> LENGTH: 25
<212> TYPE: DNA
<213> ORGANISM: Artificial Sequence
<220> FEATURE:
<223> OTHER INFORMATION: Firmicutes F_primer

<400> SEQUENCE: 2
ggagyatgtg gtttaattcg aagca                                            25

<210> SEQ ID NO 3
<211> LENGTH: 20
<212> TYPE: DNA
<213> ORGANISM: Artificial Sequence
<220> FEATURE:
<223> OTHER INFORMATION: Firmicutes R_primer

<400> SEQUENCE: 3
agctgacgac aaccatgcac                                                  20
```

<210> SEQ ID NO 4
<211> LENGTH: 22
<212> TYPE: DNA
<213> ORGANISM: Artificial Sequence
<220> FEATURE:
<223> OTHER INFORMATION: Bacteroidetes F_primer

<400> SEQUENCE: 4
gtttaattcg atgatacgcg ag                                              22

<210> SEQ ID NO 5
<211> LENGTH: 19
<212> TYPE: DNA
<213> ORGANISM: Artificial Sequence
<220> FEATURE:
<223> OTHER INFORMATION: Bacteroidetes R_primer

<400> SEQUENCE: 5
ttaasccgac acctcacgg                                                  19

<210> SEQ ID NO 6
<211> LENGTH: 22
<212> TYPE: DNA
<213> ORGANISM: Artificial Sequence
<220> FEATURE:
<223> OTHER INFORMATION: beta-Proteobacteria F_primer

<400> SEQUENCE: 6
aacgcgaaaa accttaccta cc                                              22

<210> SEQ ID NO 7
<211> LENGTH: 22
<212> TYPE: DNA
<213> ORGANISM: Artificial Sequence
<220> FEATURE:
<223> OTHER INFORMATION: beta-Proteobacteria R_primer

<400> SEQUENCE: 7 tgcccttcg tagcaactag tg                                               22

<210> SEQ ID NO 8
<211> LENGTH: 21
<212> TYPE: DNA
<213> ORGANISM: Artificial Sequence
<220> FEATURE:
<223> OTHER INFORMATION: delta/gamma-Proteobacteria F_primer

<400> SEQUENCE: 8
gctaacgcat taagtryccc g                                               21

<210> SEQ ID NO 9
<211> LENGTH: 18
<212> TYPE: DNA
<213> ORGANISM: Artificial Sequence
<220> FEATURE:
<223> OTHER INFORMATION: delta/gamma-Proteobacteria R_primer

<400> SEQUENCE: 9
gccatgcrgc acctgtct                                                   18

<210> SEQ ID NO 10
<211> LENGTH: 22
<212> TYPE: DNA
<213> ORGANISM: Artificial Sequence
<220> FEATURE:
<223> OTHER INFORMATION: epsilon-Proteobacteria F_primer

```
<400> SEQUENCE: 10
taggcttgac attgatagaa tc                                        22

<210> SEQ ID NO 11
<211> LENGTH: 21
<212> TYPE: DNA
<213> ORGANISM: Artificial Sequence
<220> FEATURE:
<223> OTHER INFORMATION: epsilon-Proteobacteria R_primer

<400> SEQUENCE: 11
cttacgaagg cagtctcctt a                                         21

<210> SEQ ID NO 12
<211> LENGTH: 18
<212> TYPE: DNA
<213> ORGANISM: Artificial Sequence
<220> FEATURE:
<223> OTHER INFORMATION: Actinobacteria F_primer

<400> SEQUENCE: 12
tgtagcggtg gaatgcgc                                             18

<210> SEQ ID NO 13
<211> LENGTH: 21
<212> TYPE: DNA
<213> ORGANISM: Artificial Sequence
<220> FEATURE:
<223> OTHER INFORMATION: Actinobacteria R_primer

<400> SEQUENCE: 13
aattaagcca catgctccgc t                                         21

<210> SEQ ID NO 14
<211> LENGTH: 19
<212> TYPE: DNA
<213> ORGANISM: Artificial Sequence
<220> FEATURE:
<223> OTHER INFORMATION: TM F_primer

<400> SEQUENCE: 14
aytgggcgta aagagttgc                                            19

<210> SEQ ID NO 15
<211> LENGTH: 22
<212> TYPE: DNA
<213> ORGANISM: Artificial Sequence
<220> FEATURE:
<223> OTHER INFORMATION: TM R_primer

<400> SEQUENCE: 15
tacggytacc ttgttacgac tt                                        22

<210> SEQ ID NO 16
<211> LENGTH: 21
<212> TYPE: DNA
<213> ORGANISM: Artificial Sequence
<220> FEATURE:
<223> OTHER INFORMATION: Verrucomicrobia F_primer

<400> SEQUENCE: 16
tcakgtcagt atggccctta t                                         21

<210> SEQ ID NO 17
```

```
<211> LENGTH: 23
<212> TYPE: DNA
<213> ORGANISM: Artificial Sequence
<220> FEATURE:
<223> OTHER INFORMATION: Verrucomicrobia R_primer

<400> SEQUENCE: 17
cagttttyag gatttcctcc gcc                                              23

<210> SEQ ID NO 18
<211> LENGTH: 25
<212> TYPE: DNA
<213> ORGANISM: Artificial Sequence
<220> FEATURE:
<223> OTHER INFORMATION: Enterobacteriaceae F_primer

<400> SEQUENCE: 18
cattgacgtt acccgcagaa gaagc                                            25

<210> SEQ ID NO 19
<211> LENGTH: 21
<212> TYPE: DNA
<213> ORGANISM: Artificial Sequence
<220> FEATURE:
<223> OTHER INFORMATION: Enterobacteriaceae R_primer

<400> SEQUENCE: 19
ctctacgaga ctcaagcttg c                                                21

<210> SEQ ID NO 20
<211> LENGTH: 24
<212> TYPE: DNA
<213> ORGANISM: Artificial Sequence
<220> FEATURE:
<223> OTHER INFORMATION: Escherichia coli F_primer

<400> SEQUENCE: 20
cgcgtactat acgccatgaa cgta                                             24

<210> SEQ ID NO 21
<211> LENGTH: 22
<212> TYPE: DNA
<213> ORGANISM: Artificial Sequence
<220> FEATURE:
<223> OTHER INFORMATION: Escherichia coli R_primer

<400> SEQUENCE: 21
accgttgatc acttcggtca gg                                               22

<210> SEQ ID NO 22
<211> LENGTH: 24
<212> TYPE: DNA
<213> ORGANISM: Artificial Sequence
<220> FEATURE:
<223> OTHER INFORMATION: Klebsiella spp. F_primer

<400> SEQUENCE: 22
gatacggagt atgcctttac ggtg                                             24

<210> SEQ ID NO 23
<211> LENGTH: 24
<212> TYPE: DNA
<213> ORGANISM: Artificial Sequence
<220> FEATURE:
<223> OTHER INFORMATION: Klebsiella spp. R_primer

<400> SEQUENCE: 23
```
tagcctttat caagcggata ctgg                                              24

<210> SEQ ID NO 24
<211> LENGTH: 21
<212> TYPE: DNA
<213> ORGANISM: Artificial Sequence
<220> FEATURE:
<223> OTHER INFORMATION: Klebsiella oxytoca F_primer

<400> SEQUENCE: 24 gttaataacct ttgctcattg a                                                21

<210> SEQ ID NO 25
<211> LENGTH: 21
<212> TYPE: DNA
<213> ORGANISM: Artificial Sequence
<220> FEATURE:
<223> OTHER INFORMATION: Klebsiella oxytoca R_primer

<400> SEQUENCE: 25
accagggtat ctaatcctgt t                                                 21

<210> SEQ ID NO 26
<211> LENGTH: 25
<212> TYPE: DNA
<213> ORGANISM: Artificial Sequence
<220> FEATURE:
<223> OTHER INFORMATION: Morganella morganii F_primer

<400> SEQUENCE: 26
ctcgcaccat cagatgaacc catat                                             25

<210> SEQ ID NO 27
<211> LENGTH: 29
<212> TYPE: DNA
<213> ORGANISM: Artificial Sequence
<220> FEATURE:
<223> OTHER INFORMATION: Morganella morganii R_primer

<400> SEQUENCE: 27
caaagcatct ctgctaagtt ctctggatg                                         29

<210> SEQ ID NO 28
<211> LENGTH: 16
<212> TYPE: DNA
<213> ORGANISM: Artificial Sequence
<220> FEATURE:
<223> OTHER INFORMATION: Lactobacillus reuteri F_primer

<400> SEQUENCE: 28
gaacgcaytg gcccaa                                                       16

<210> SEQ ID NO 29
<211> LENGTH: 19
<212> TYPE: DNA
<213> ORGANISM: Artificial Sequence
<220> FEATURE:
<223> OTHER INFORMATION: Lactobacillus reuteri R_primer

<400> SEQUENCE: 29
tccattgtgg ccgatcagt                                                    19

<210> SEQ ID NO 30
<211> LENGTH: 20
<212> TYPE: DNA

```
<213> ORGANISM: Artificial Sequence
<220> FEATURE:
<223> OTHER INFORMATION: Lactobacillus johnsonii F_primer

<400> SEQUENCE: 30
cactagacgc atgtctagag                                             20

<210> SEQ ID NO 31
<211> LENGTH: 20
<212> TYPE: DNA
<213> ORGANISM: Artificial Sequence
<220> FEATURE:
<223> OTHER INFORMATION: Lactobacillus johnsonii R_primer

<400> SEQUENCE: 31
agtctctcaa ctcggctatg                                             20

<210> SEQ ID NO 32
<211> LENGTH: 20
<212> TYPE: DNA
<213> ORGANISM: Artificial Sequence
<220> FEATURE:
<223> OTHER INFORMATION: Lactobacillus plantarum F_primer

<400> SEQUENCE: 32
tcatgattta catttgagtg                                             20

<210> SEQ ID NO 33
<211> LENGTH: 21
<212> TYPE: DNA
<213> ORGANISM: Artificial Sequence
<220> FEATURE:
<223> OTHER INFORMATION: Lactobacillus plantarum R_primer

<400> SEQUENCE: 33
gaccatgcgg tccaagttgt t                                           21

<210> SEQ ID NO 34
<211> LENGTH: 20
<212> TYPE: DNA
<213> ORGANISM: Artificial Sequence
<220> FEATURE:
<223> OTHER INFORMATION: Lactobacillus rhamnosus F_primer

<400> SEQUENCE: 34
cgcccttaac agcagtcttc                                             20

<210> SEQ ID NO 35
<211> LENGTH: 20
<212> TYPE: DNA
<213> ORGANISM: Artificial Sequence
<220> FEATURE:
<223> OTHER INFORMATION: Lactobacillus rhamnosus R_primer

<400> SEQUENCE: 35
gccctccgta tgcttaaacc                                             20

<210> SEQ ID NO 36
<211> LENGTH: 52
<212> TYPE: DNA
<213> ORGANISM: Artificial Sequence
<220> FEATURE:
<223> OTHER INFORMATION: Bacterial 16S rDNA F_primer

<400> SEQUENCE: 36
tcgtcggcag cgtcagatgt gtataagaga caggtgccag cmgccgcggt aa         52
```

-continued

```
<210> SEQ ID NO 37
<211> LENGTH: 54
<212> TYPE: DNA
<213> ORGANISM: Artificial Sequence
<220> FEATURE:
<223> OTHER INFORMATION: Bacterial 16S rDNA R_primer

<400> SEQUENCE: 37
gtctcgtggg ctcggagatg tgtataagag acagggacta chvgggtwtc taat        54

<210> SEQ ID NO 38
<211> LENGTH: 1460
<212> TYPE: DNA
<213> ORGANISM: Artificial Sequence
<220> FEATURE:
<223> OTHER INFORMATION: NK98 16S rDNA

<400> SEQUENCE: 38
ctcaggatga acgctggcgg cgtgcttaac acatgcaagt cgaacgggat cccaggagct    60
tgctcctggg tgagagtggc gaacgggtga gtaatgcgtg accgacctgc cccatacacc   120
ggaatagctc ctggaaacgg gtggtaatgc cggatgctcc agttggatgc atgtccttct   180
gggaaagatt catcggtatg ggatggggtc gcgtcctatc agcttgatgg cggggtaacg   240
gcccaccatg gcttcgacgg gtagccggcc tgagagggcg accggccaca ttgggactga   300
gatacggccc agactcctac gggaggcagc agtggggaat attgcacaat gggcgcaagc   360
ctgatgcagc gacgccgcgt gcgggatgac ggccttcggg ttgtaaaccg ctttttgactg   420 ggagcaagcc cttcggggtg agtgtacctt tcgaataagc accggctaac tacgtgccag   480
cagccgcggt aatacgtagg gtgcaagcgt tatccggaat tattgggcgt aaagggctcg   540
taggcggttc gtcgcgtccg gtgtgaaagt ccatcgctta acggtggatc cgcgccgggt   600
acgggcgggc ttgagtgcgg taggggagac tggaattccc ggtgtaacgg tggaatgtgt   660
agatatcggg aagaacacca atggcgaagg caggtctctg ggccgtcact gacgctgagg   720
agcgaaagcg tggggagcga acaggattag ataccctggt agtccacgcc gtaaacggtg   780
gatgctggat gtggggacca ttccacggtc tccgtgtcgg agccaacgcg ttaagcatcc   840
cgcctgggga gtacggccgc aaggctaaaa ctcaaagaaa ttgacggggg cccgcacaag   900
cggcggagca tgcggattaa ttcgatgcaa cgcgaagaac cttacctggg cttgacatgt   960
tcccgacagc cccagagatg gggcctccct tcggggcggg ttcacaggtg gtgcatggtc  1020
gtcgtcagct cgtgtcgtga gatgttgggt taagtcccgc aacgagcgca accctcgccc  1080
tgtgttgcca gcacgtcgtg gtgggaactc acggggggacc gccggggtca actcggagga  1140
aggtggggat gacgtcagat catcatgccc cttacgtcca gggcttcacg catgctacaa  1200
tggccggtac aacgggatgc gacactgtga ggtggagcgg atcccttaaa accggtctca  1260
gttcggattg gagtctgcaa cccgactcca tgaaggcgga gtcgctagta atcgcggatc  1320
agcaacgccg cggtgaatgc gttcccgggc cttgtacaca ccgcccgtca agtcatgaaa  1380
gtgggtagca cccgaagccg gtggcccaac cttttttgggg ggagccgtct aaggtgagac  1440
tcgtgattgg gactaatcta                                              1460
```